(12) United States Patent
Ortmann et al.

(10) Patent No.: US 12,517,097 B2
(45) Date of Patent: Jan. 6, 2026

(54) VALVE WITH AXIAL ANGLE COMPENSATION

(71) Applicant: Agilent Technologies, Inc., Santa Clara, CA (US)

(72) Inventors: Thomas Ortmann, Ottenhausen (DE); Blasius Nocon, Waldbronn (DE); Armin Steinke, Ettlingen (DE); Christian Daniel Ruf, Karlsbad (DE)

(73) Assignee: Agilent Technologies, Inc., Santa Clara, CA (US)

( * ) Notice: Subject to any disclaimer, the term of this patent is extended or adjusted under 35 U.S.C. 154(b) by 314 days.

(21) Appl. No.: 18/018,540

(22) PCT Filed: Jul. 29, 2021

(86) PCT No.: PCT/IB2021/056914
§ 371 (c)(1),
(2) Date: Jan. 27, 2023

(87) PCT Pub. No.: WO2022/024028
PCT Pub. Date: Feb. 3, 2022

(65) Prior Publication Data
US 2023/0296571 A1 Sep. 21, 2023

(30) Foreign Application Priority Data
Jul. 30, 2020 (DE) .......................... 102020120196.6

(51) Int. Cl.
*G01N 30/20* (2006.01)
*G01N 30/02* (2006.01)

(52) U.S. Cl.
CPC ....... *G01N 30/20* (2013.01); *G01N 2030/027* (2013.01); *G01N 2030/205* (2013.01)

(58) Field of Classification Search
CPC ............. G01N 30/20; G01N 2030/027; G01N 2030/205
See application file for complete search history.

(56) References Cited

U.S. PATENT DOCUMENTS 3,990,476 A   11/1976   Young et al.
6,889,710 B2   5/2005   Wagner
(Continued)

FOREIGN PATENT DOCUMENTS

AT      511185 A1        9/2012
DE   102011082794 A1 *   3/2013   ............. F16J 15/104
(Continued)

OTHER PUBLICATIONS

PCT Notification of Transmittal of The International Search Report & Written Opinion mailed on Nov. 5, 2021 for Application No. PCT/IB2021/056914; 17 Pages.

*Primary Examiner* — Jamel E Williams

(57) ABSTRACT

A valve may be utilized in a high-performance chromatography system for separating components of a sample liquid introduced into a mobile phase. The valve has a first valve element and a second valve element. By a movement of one valve element relative to the other, a first effective surface of the first valve element is brought into connection with a second effective surface of the second valve element, and a flow path may be produced or suppressed. The second valve element has an elastic region to compensate for an axial angle between the first valve element and the second valve element, such that the first effective surface and the second effective surface may be oriented parallel to each other. This may favorably influence a fluidic leak tightness and/or longevity of the valve.

20 Claims, 17 Drawing Sheets

(56) References Cited

U.S. PATENT DOCUMENTS

| | | | |
|---|---|---|---|
| 7,159,848 B2 | 1/2007 | Brennen | |
| 9,303,775 B2 * | 4/2016 | Jencks | ................ F16K 11/0743 |
| 9,863,215 B2 | 1/2018 | Jayaram et al. | |
| 10,300,403 B2 | 5/2019 | Haertl et al. | |
| 10,384,151 B2 | 8/2019 | Liu et al. | |
| 10,428,960 B2 | 10/2019 | Gamache | |
| 10,520,477 B2 | 12/2019 | Liu et al. | |
| 2012/0021529 A1 * | 1/2012 | Nachef | ............... F16K 99/0015 |
| | | | 422/537 |
| 2014/0174541 A1 | 6/2014 | Jencks et al. | |
| 2016/0334031 A1 | 11/2016 | Shoykhet et al. | |
| 2017/0343520 A1 | 11/2017 | Ortmann et al. | |
| 2018/0164259 A1 | 6/2018 | Liu et al. | |

FOREIGN PATENT DOCUMENTS

| | | | | |
|---|---|---|---|---|
| DE | 102016108101 A1 | 12/2016 | | |
| EP | 2165098 A1 | 3/2010 | | |
| EP | 2165098 B1 * | 4/2012 | .......... | F16K 11/0743 |
| JP | 2001032950 A | 2/2001 | | |
| WO | 2010139359 A1 | 12/2010 | | |
| WO | WO-2012095097 A1 * | 7/2012 | .......... | F16K 11/0743 |
| WO | 2013007433 A1 | 1/2013 | | |
| WO | 2017025857 A1 | 2/2017 | | |
| WO | WO-2018138626 A1 * | 8/2018 | .......... | F16K 11/0743 |

* cited by examiner

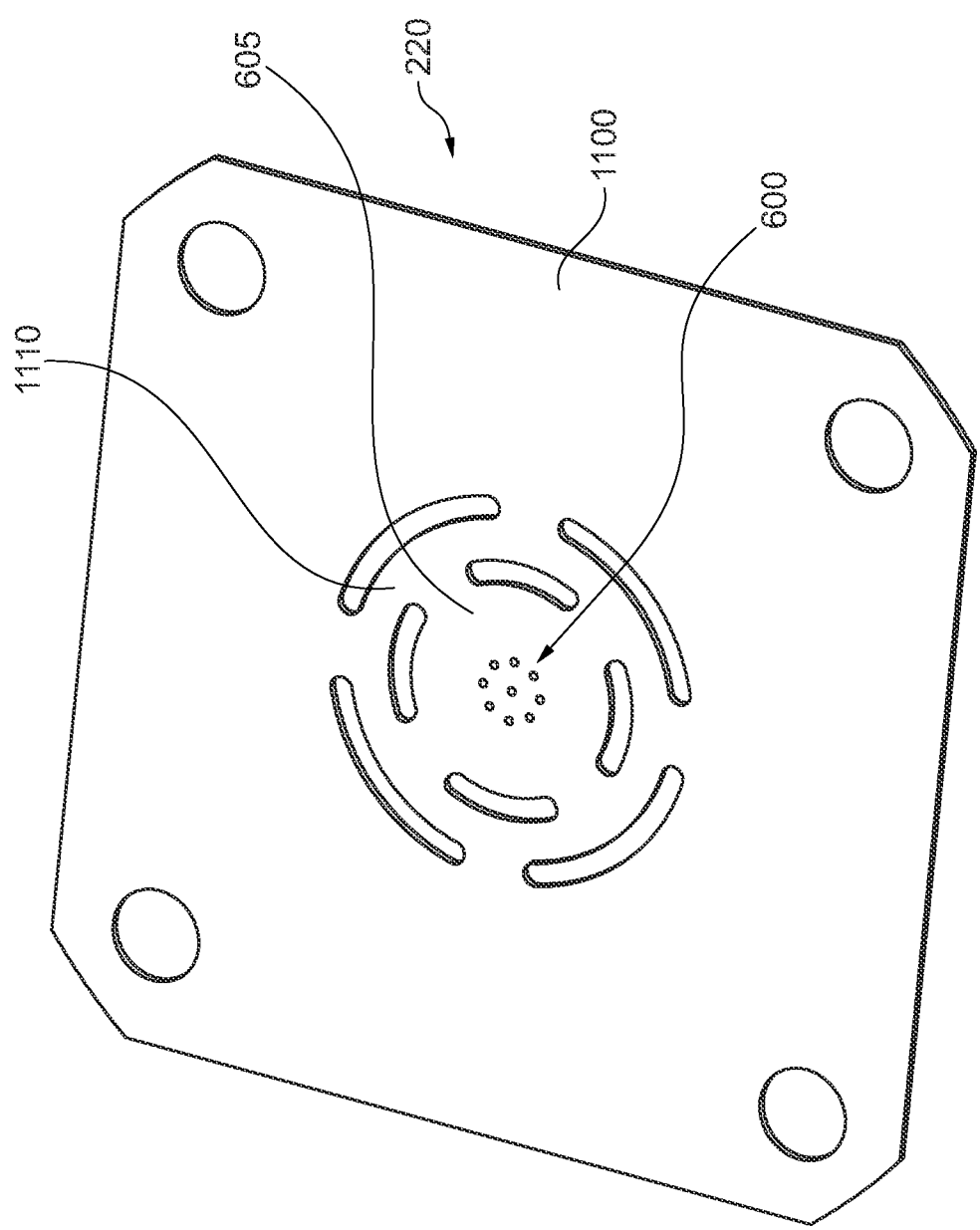

VALVE WITH AXIAL ANGLE COMPENSATION

RELATED APPLICATIONS

This application is the national stage under 35 U.S.C. 371 of International Application No. PCT/IB2021/056914, filed Jul. 29, 2021; which claims priority to German Application No. DE 10 2020 120 196.6, filed Jul. 30, 2020; the entire contents of each of which are incorporated by reference herein.

TECHNICAL FIELD

The present invention relates to valves, in particular for HPLC applications.

BACKGROUND

In high-performance liquid chromatography (HPLC), a liquid must be pumped at typically very tightly controlled flow rates (e.g., in the nanoliter to milliliter per minute range) and at a high pressure (typically 20-100 MPa, 200-1000 bar and beyond, up to presently about 200 MPa, 2000 bar) where the compressibility of the liquid becomes appreciable. For liquid separation in an HPLC system, a mobile phase, which—during operation—comprises a sample liquid including components to be separated, is forced through a stationary phase (such as a chromatographic column) in order to separate different components of the sample in this way. The composition of the mobile phase can be constant over time (isocratic mode) or vary (e.g., in the so-called gradient mode).

The fluidic sealing of the flow path can be problematic in many HPLC applications, in particular at high pressures of the mobile phase. This is true, in particular, at those points where the flow path can be disconnected at least temporarily, such as, e.g., at valves or so-called fittings, which are used to mechanically connect different fluidic elements.

Valves are often used in HPLC applications to establish (or create) or prevent (or block) one or more flow paths. Rotary valves are typically suitable for this purpose, in which corresponding flow paths can be influenced by a relative movement of a rotor with respect to a stator. An axial offset, in particular between the rotor and the stator, can be critical, in particular for leak tightness but also for the longevity of such shear valves.

SUMMARY

There may be a need to improve valves with regard to a possible angular offset of elements cooperating with each other, in particular for HPLC applications.

One implementation relates to a valve, for example for use in a high-performance chromatography system for separating components of a sample liquid introduced into a mobile phase. The valve has a first valve element and a second valve element, wherein, by way of a relative movement of the first valve element with respect to the second valve element, a first effective surface of the first valve element can be brought into connection with a second effective surface of the second valve element and a flow path can be established or prevented. The second valve element has an elastic region in order to compensate for an axial angle between the first valve element and the second valve element, so that the first effective surface and the second effective surface can be aligned parallel to each other. This allows the compensation of an axial angle between the first and the second valve element, that is to say, e.g., between a rotor and a stator, and can thus favorably influence a fluidic leak tightness and/or longevity of the valve. The parallel alignment of the opposing effective surfaces of the valve elements leads to a uniform, or at least more uniform, force distribution along these effective surfaces and can thus avoid, or at least reduce, increased mechanical stress and in particular increased abrasion between the valve elements.

In one exemplary implementation, the second valve element comprises an outer region and an inner region. The inner region comprises the second effective surface, and the outer region is connected to the inner region via the elastic region, so that the inner region is elastically movable with respect to the outer region as a result of the elastic region. This structure allows an elastic relative movement between the inner region and the outer region and can, in particular, counteract an axial offset between the first and second valve elements by means of such an elastic relative movement.

In one exemplary implementation, the outer region is fixedly arranged with respect to the first valve element, and the inner region is elastically alignable with respect to the first valve element.

In one exemplary implementation, the elastic region comprises one or more webs that are each connected to the outer region on one side and to the inner region on the opposite side, so that the inner region can tilt with respect to the outer region.

In one exemplary implementation, the first valve element is a rotor, and the second valve element is a stator, the rotor being rotatable with respect to the stator.

One exemplary implementation of the valve comprises a sealing structure which is configured in such a way that a pressure of a fluid causes an at least partial increase in volume of the sealing structure, so that the first valve element and the second valve element are pressed against each other for fluidically sealing the flow path.

In one exemplary implementation, the sealing structure comprises a region that is elastically deformable in a manner similar to a hydraulic cushion, so that the axial angle between the first valve element and the second valve element leads to a variation in a thickness of the sealing structure when the first effective surface and the second effective surface are aligned parallel to each other and are pressed against each other.

In one exemplary implementation, the valve comprises a flow element. The flow element has a flow path configured to transport the mobile phase. A sealing structure (which may be a pressure force structure) is or can be connected to the mobile phase to effectuate fluidic sealing of the flow path under the influence of a pressure of the mobile phase. The sealing structure is configured in such a way that there is an at least partial increase in volume of the sealing structure (e.g., within the flow path of the sealing structure) under the influence of the pressure of the mobile phase, and this at least partial increase in volume effectuates the fluidic sealing of the flow path.

In an implementation, the flow element comprises an inlet and an outlet, wherein the flow path is or can be fluidly connected to the inlet and the outlet.

A flow element according to the present disclosure allows dynamic and/or adaptive fluidic sealing of the flow path in that the mobile phase to be fluidly sealed is itself used for the fluidic sealing and brings this about, or at least enhances this. A low pressure of the mobile phase, which requires correspondingly lower forces to fluidly seal this mobile phase, can result in lower sealing forces that are required for the fluidly sealing. Conversely, higher pressure of the mobile phase, which in turn requires higher forces to fluidly seal this mobile phase, can result in higher sealing forces that are required for the fluidly sealing.

A flow element according to the present disclosure can therefore adjust the sealing force adaptively and dynamically to the particular need (in terms of the required sealing force for ensuring a sufficiently fluid-tight seal). This can avoid excessive sealing forces, in particular when these are not required at all for adequate fluidic sealing, and can thus reduce wear and/or extend the longevity of the components to be sealed.

Furthermore, a flow element according to the present disclosure allows a connection that is to be sealed fluidly to be subjected to static forces by only a small degree, i.e., only to low static forces, in order to mechanically secure the connection to be sealed (but not yet to seal it fluidly, for example). The forces for a required fluidic seal are then contributed dynamically and adaptively by the flow element. This can, in particular, be advantageous for fluidic connections where, e.g., two fluidic components (e.g., a capillary and a device to which the capillary is to be connected) are to be mechanically coupled to each other and fluidly connected. A flow element according to the present disclosure here allows the connection initially to be mechanically coupled, e.g., screwed on, in a "hand-tight" manner (i.e., using low forces, such as can be achieved, for example, by coupling or closing by hand), whereby initially either only slight or no fluidic sealing at all takes place. During operation, i.e., when the mobile phase is applied, the pressure of the mobile phase dynamically leads to an increase in the sealing force and can thus adaptively lead to fluidic sealing of the connection. By reducing the forces of the static forces to a "hand-tight" connection, these static forces can be kept low and thus extend the longevity of the components involved. This also enables a "tool-free" production of a high-pressure-resistant connection.

In one exemplary implementation, the sealing structure is configured in such a way that there is an at least partial increase in volume (e.g., bulging) of the sealing structure under the influence of the mobile phase pressure, which effectuates the fluidic sealing of the flow path, which may be the result of pressing-on opposite surfaces. Such an increase in volume can technically correspond to the function of an expansion body, i.e., a body whose volume expands at least partially under the influence of the pressure of a medium flowing through the body. When the sealing structure abuts against another surface, the increase in volume of the sealing structure can exert a force on the other surface, which in turn leads to a contact force of the sealing structure against the other surface if the other surface cannot avoid this contact force. By suitably configuring the sealing structure, so that the increase in volume is limited locally, that is to say to a section of mutually opposing surfaces, a sealing effect of these opposing surfaces can be enhanced even further.

In one exemplary implementation, the flow element comprises a first surface, and the sealing structure comprises a second surface, the first surface being located opposite the second surface. The at least partial increase in volume of the sealing structure takes place in the first surface, such as by an at least partial bulging of the first surface, so that the increase in volume leads to the first surface being pressed against the second surface, such as by the bulge abutting and pressing against the second surface, and thereby the fluidic sealing of the flow path is effectuated.

In one exemplary implementation, the sealing structure comprises a sealing channel, which is or can be connected to the mobile phase in order to effectuate fluidic sealing of the flow path under the influence of a pressure of the mobile phase. Instead of the mobile phase, another pressurized fluid could flow through the sealing channel, although this may require a separate pump. In this case, the sealing channel is separate from the flow path and is fluidly separated therefrom.

In one exemplary implementation, the first valve element comprises the sealing structure, wherein the sealing structure of the first valve element presses against the second valve element at least for fluidically sealing the flow path.

In one exemplary implementation, the second valve element comprises the sealing structure, wherein the sealing structure of the second valve element presses against the first valve element at least for fluidically sealing the flow path.

In one exemplary implementation, the sealing structure is separate from the first valve element and the second valve element, wherein the sealing structure presses the first valve element and the second valve element against each other at least for fluidically sealing the flow path.

In one exemplary implementation, the valve is a rotary valve, wherein the first (e.g., movable) valve element is a rotor, and the second (e.g., fixed) valve element is a stator, and the flow path (e.g., between the inlet and the outlet) can be established or prevented fluidically by rotation of the rotor with respect to the stator.

In one exemplary implementation, the valve is a translational valve, wherein the flow path (e.g., between the inlet and the outlet) can be established or prevented fluidically by translation of the first valve element with respect to the second valve element.

In one exemplary implementation of the valve, the sealing structure is arranged with respect to the first valve element and/or the second valve element and acts thereon in such a way that an axial angular offset between the first valve element and the second valve element is compensated for or at least reduced. In an implementation, the first valve element is axially fixedly arranged in the valve and the second valve element, or at least a region thereof, can elastically align with respect to the axial arrangement of the first valve element, wherein the sealing structure is arranged with respect to the second valve element and acts thereon in such a way that the second valve element adapts to the axial arrangement of the first valve element.

In one exemplary implementation of the valve, the sealing structure furthermore allows dynamic adaptation to a switching process and/or a switching behavior of the valve. For example, a contact pressure, for example between interacting valve elements such as the rotor and the stator, can be controlled as a function of a switching process, so that, e.g., the contact pressure is reduced before and/or during a relative movement of the interacting valve elements in order to facilitate the switching process, or in order to reduce or even avoid wear and/or abrasion. Alternatively or additionally, the contact pressure can also be increased after a relative movement of the interacting valve elements in order to improve fluidic sealing of the valve. Of course, the contact pressure can be dynamically adjusted or controlled in other ways, in particular to suitably support applications of the valve.

In one exemplary implementation, the flow element comprises a plurality of layers, including at least one microfluidic channel that is formed by one or more recesses in at least one of the plurality of layers. The plurality of layers may be joined to each other by a bonding process (such as, e.g., diffusion bonding). Other joining methods, such as, e.g., conventional welding, e.g., at the edge, can likewise be employed. Alternatively or additionally, additive methods such as 3D printing, micro-embossing of structures, and the like can also be employed. At least one of the layers may comprise a material from the group: metal, in particular stainless steels, such as high quality (such as, e.g., 316 L, MP35N, 304), ceramic, in particular aluminum oxide, magnesium oxide, zirconium oxide, aluminum titanate, polymer, in particular polyether ether ketone (PEEK), ULTEM polymer, polyetherketoneketone (PEKK), polyetherimide (PEI), and the like, or is formed of it.

In one exemplary implementation, the sealing structure comprises the plurality of structures.

In one exemplary implementation, the sealing structure comprises the plurality of structures, wherein the sealing structure is configured in such a way that the at least one microfluidic channel can expand at least in a section under the influence of the pressure of the mobile phase so as to effectuate the fluidic sealing of the flow path.

In one implementation, the at least one microfluidic channel forms at least part of the flow path.

In one exemplary implementation, the sealing structure is spatially separated from the flow path, at least in the region of the flow path of the flow element that is to be sealed by the sealing structure.

In one exemplary implementation, the sealing structure is not part of the flow path to be sealed by the sealing structure.

In one exemplary implementation, the flow path, at least the part of the flow path to be sealed by the sealing structure, comprises an outer wall within which the mobile phase can flow. The sealing structure may be spatially separated from the outer wall, and the sealing structure may be located outside the flow path and the outer wall thereof.

In one exemplary implementation, the sealing structure is part of the flow path and the mobile phase flowing through the flow path flows through the sealing structure. The flow path can be sealed by a bulge of a section of the flow path effectuated by the pressure of mobile phase and by this bulge abutting and pressing against another surface. This other surface may be fixed spatially or can at least only move to a lesser degree in the direction of the bulge than the bulge itself is deflected, so that, as a result, the bulge can be pressed against this surface.

An implementation relates to a high-performance chromatography system including a pump for moving a mobile phase and a stationary phase for separating components of a sample liquid that is introduced into the mobile phase. The high-performance chromatography system furthermore comprises a valve as described above, in particular a valve for controlling, establishing or preventing the flow path for the transport of the mobile phase.

In one exemplary implementation, the flow element is configured in such a way that the pressure of the mobile phase acting on the sealing structure can be suitably adjusted and/or controlled, such as independently of a use of the mobile phase for the separation of the sample liquid. For example, part of the mobile phase can be diverted for the flow element, with another part of the mobile phase being used for the separation of the sample liquid. In an implementation, the pressure of the mobile phase acting on the sealing structure can be varied, e.g., independently of a pressure of the mobile phase for the separation of the sample liquid. The pressure of the mobile phase acting on the sealing structure may be varied by a suitable pump, which in the case of a high-performance chromatography system can be one or more pumps of the system. As an alternative to a pump, other known mechanisms for generating pressure can also be employed accordingly. The pressure of the mobile phase can be controlled differently at different points by suitable interconnection (for example by means of valves) and control.

In one exemplary implementation, the flow element can be preconfigured so that the mobile phase acting on the sealing structure is set to a given pressure value, for example. The mobile phase acting on the sealing structure may then be fluidly separated from the mobile phase that is used for separating the sample liquid, at least during an analysis phase for separating the introduced sample liquid. For example, where the flow element is or comprises a valve or fitting, the valve and/or fitting can be appropriately preloaded and set using a desired pressure of the mobile phase acting on the sealing structure.

In an exemplary implementation of the high-performance chromatography system, the flow element is configured in such a way that a delay volume of the high-performance chromatography system can be adjusted. The delay volume represents a volume between a mixing point of the mobile phase and the stationary phase. In an implementation, the flow element allows a given delay volume of the high-performance chromatography system to be increased, e.g., by adding a volume through which the mobile phase flows. The volume of the flow element through which the mobile phase flows can be suitably set or preselected by a suitable spatial design. For example, the flow-through volume can be selectively varied and in a settable manner. Alternatively, a flow element that is suitable for the particular application can be selected from a plurality of given flow elements, each having a given flow-through volume, and be used, for example by way of a suitable interconnection (e.g., by means of a valve or other switching elements) or by appropriate fluidic insertion of the flow element into the system. Using such a setting or adjustment of the resulting delay volume of the entire high-performance chromatography system, it is possible to emulate the dynamic behavior of another target high-performance chromatography system so that the high-performance chromatography system used behaves at least substantially similarly to the target high-performance chromatography system as a result of the adjustment of the delay volume.

A high-performance chromatography system according to the present disclosure comprises a pump for moving a mobile phase, a stationary phase for separating components of a sample liquid introduced into the mobile phase, and a valve, as described above, located in a flow path of the mobile phase. The high-performance chromatography system can furthermore comprise a sample injector for introducing the sample liquid into the mobile phase, a detector for detecting separated components of the sample liquid and/or a fractionation device for dispensing separated components of the sample liquid.

Implementations of the present disclosure can be implemented on the basis of many of the known HPLC systems, such as, e.g., the Agilent Infinity Series 1290, 1260, 1220 and 1200 from the applicant Agilent Technologies, Inc., see www.agilent.com.

A pure solvent or a mixture of various solvents can be used as the mobile phase (or eluent). The mobile phase can be chosen so as to minimize the retention of components of interest and/or the amount of mobile phase to operate the chromatography. The mobile phase can also be chosen so as to effectively separate specific components. The mobile phase can include an organic solvent, such as, e.g., methanol or acetonitrile, which is often diluted with water. For a gradient operation, the mixing ratio of water and an organic solvent (or other solvents customary in HPLC) is often varied over time.

One or more of the methods explained above may be controlled, supported or executed in whole or in part by software running on a data processing system, such as a computer or a workstation. In this case or for this purpose, the software can be stored on a data carrier.

BRIEF DESCRIPTION OF THE DRAWINGS

The present subject matter is explained further hereafter with reference to the drawings, in which identical reference numerals refer to identical or functionally identical or similar features.

FIG. 17 is a schematic, perspective view of an example of a stator according to another implementation of the present disclosure.

DETAILED DESCRIPTION

Figure 1:
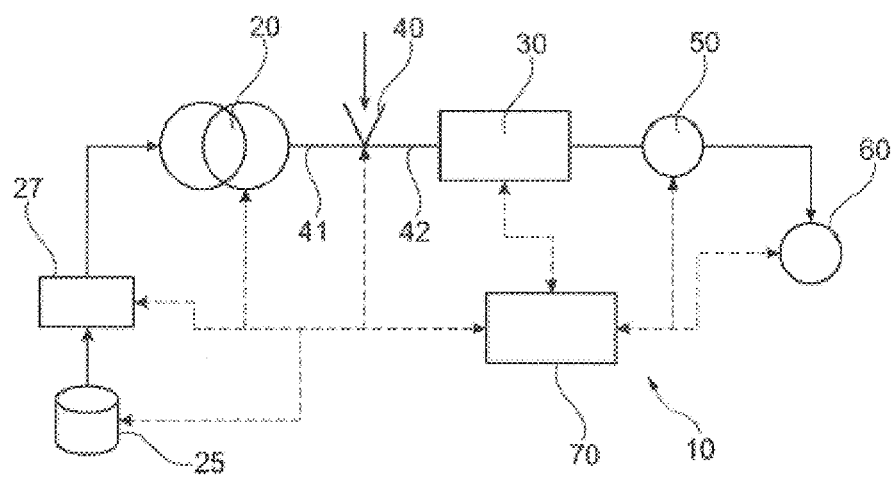
FIG. 1 is a schematic view of an example of a liquid separation system in accordance with implementations of the present disclosure, as may be used in HPLC, for example.

In detail, FIG. 1 shows a general illustration of a liquid separation system 10. A pump 20 receives a mobile phase from a solvent supply unit 25, typically via a degasser 27, which degasses the mobile phase and thereby reduces the amount of dissolved gases in the mobile phase. Pump 20 forces the mobile phase through a separation device 30 (such as a chromatographic column) containing a stationary phase. A sampling device (or sample injector) 40 may be provided between pump 20 and separation device 30 for introducing a sample fluid into the mobile phase. A fluidic line between pump 20 and sample injector 40 is denoted by reference numeral 41, and a fluidic line between sample injector 40 and separation device 30 is denoted by reference numeral 42. The stationary phase of the separation device 30 is adapted to separate components of the sample fluid. A detector 50 detects separated components of the sample fluid, and a fractionation device 60 may be provided for dispensing the separated components.

The mobile phase can be made up of just one solvent or a mixture of different solvents. The mixing can be carried out at low pressure and upstream from pump 20 so that pump 20 already pumps the mixed solvent as the mobile phase. Alternatively, the pump 20 can be made up of individual pump units, with each pump unit pumping one solvent or one solvent mixture, so that the mixing of the mobile phase (as separation device 30 then receives it) takes place under high pressure and downstream from pump 20. The composition (mixture) of the mobile phase can be kept constant over time (isocratic mode) or varied over time in a so-called gradient mode.

A data processing unit 70, which may be a conventional PC or workstation, may be coupled to one or more of the devices in liquid separation system 10, as indicated by the dashed arrows, so as to receive information and/or control the operation of the liquid separation system or individual components thereof.

Figure 2:
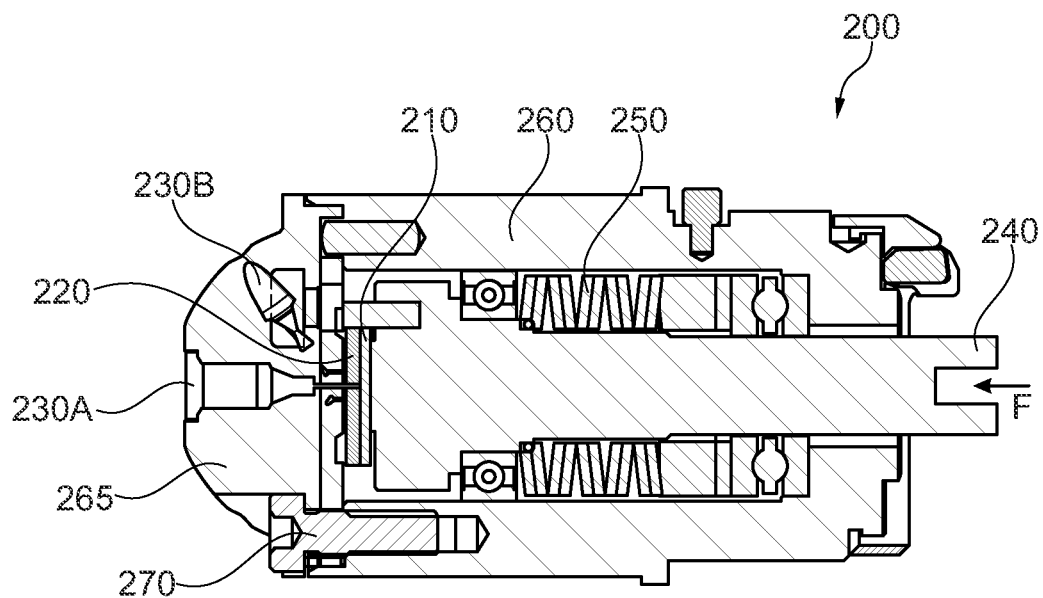
FIG. 2 is a sectional view of an example of a valve, such as can be used in sample injector, for example.

FIG. 2 shows an example of a valve 200, such as may be used in sample injector 40, e.g., for injecting the sample fluid into the mobile phase. Such injectors, including switchable valves, are well-known in the prior art, such as, e.g., from WO2010139359A1, US20160334031 A1 or US2017343520A1, all by the same applicant, the entire contents of each of which are incorporated by reference herein. The first two documents show the injector in a so-called flow-through configuration, in which a sample loop in which the sample fluid is situated is connected between the pump 20 and the separation device 30 during the injection. The third document, in contrast, describes an injector in the so-called feed-injection configuration, in which the sample fluid is pushed into the mobile phase between the pump 20 and the separation device 30 by means of a T-coupling, so that a sample flow containing the sample fluid is added to the flow of the mobile phase.

The valve 200 shown by way of example in FIG. 2 is a so-called rotary valve in which a rotor 210 and a stator 220 rotate relative to each other, typically with the rotor 210 being rotated with respect to the stator 220. So-called ports can be present both in the rotor 210 and in the stator 220, each of which represents an open end to a respective flow path, which can be connected to valve 200 via corresponding ports 230A, 230B, and the like. Furthermore, both rotor 210 and stator 22 can comprise corresponding connecting elements (e.g., recesses such as flutes, grooves, and the like) which can fluidly connect one or more ports with each other as a result of a relative movement of the rotor 210 and the stator 220. This is shown only schematically in FIG. 2 and is well-known in the prior art, e.g., from the aforementioned documents. It is likewise known that so-called translational valves can also be used as an alternative to rotary valves, in which a translational movement is carried out instead of a rotational movement.

In the exemplary implementation of FIG. 2, valve 200 furthermore shows a drive 240 for moving rotor 210, e.g., a rotatable shaft that can be driven by a motor, for example. Drive 240 can be fixedly connected to rotor 210 or even be an integral part thereof. Drive 240, together with rotor 210, may be elastically/resiliently pressed against stator 220, e.g., by means of a spring assembly 250. Rotor 210, drive 240 and spring assembly 250 can be arranged in a housing 260. Stator 220, together with ports 230, may be arranged in a valve head 265 which can be connected to housing 260, e.g., by means of a screw connection 270.

Valve 200 can, for example, be switched in such a way that fluidic line 41 is connected to connection 230A, and fluidic line 42 is connected to connection 230B. By suitably configuring rotor 210 and stator 220, in particular by designing suitable connecting elements, a desired functionality in the fluidic coupling between fluidic lines 41 and 42 can be configured, as is well-known in the prior art.

To achieve fluidic tightness, e.g., in the liquid path between lines 41 and 42, between rotor 210 and stator 220, the prior art usually proposes a corresponding dimensioning of spring assembly 250 or another static biasing mechanism, so that rotor 210 presses axially (i.e., in the direction of sealing force F) against stator 220 with a desired sealing force F. A sealing force F that is too low can lead to a leak (in particular between rotor 210 and stator 220), while a sealing force F that is too high can result in increased wear (in particular of the friction components between rotor 210 and stator 220).

Figure 3:
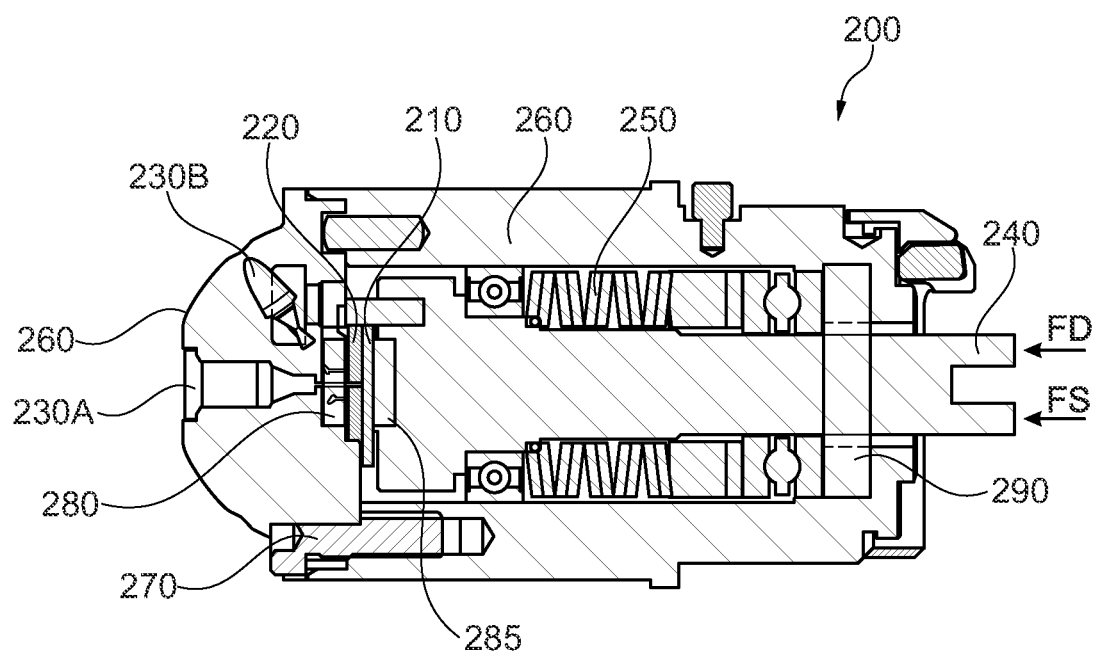
FIG. 3 is a sectional view of another example of a valve, and uses exemplary implementations according to FIG. 2 to illustrate various options according to the present disclosure for achieving dynamic fluidic sealing between a rotor and a stator.

FIG. 3 uses the exemplary implementation according to FIG. 2 to show various options for achieving dynamic and adaptive fluidic sealing between rotor 210 and stator 220. The options presented for dynamic sealing can be used alternatively or in combination with each other. Overall, each of the options presented (for dynamic sealing) leads to a dynamic axial force FD that can be superimposed on a static axial force FS. In absolute terms, the dynamic axial force FD is dependent on the particular pressure of the mobile phase, i.e., a low pressure of the mobile phase results in a low dynamic axial force FD, and a high pressure of the mobile phase results in a higher dynamic axial force FD. The static axial force FS can be imposed and dimensioned, for example, by spring assembly 250 or corresponding other measures that are well-known in the prior art.

The first option for dynamic sealing shown in FIG. 3 is a first sealing element 280, the second option is a second sealing element 285, and the third option is a third sealing element 290. Sealing elements 280-290 are also referred to as sealing structures (or pressure force structures) and will be described in more detail hereafter and supported by exemplary implementations. Generally speaking, each of these sealing elements 280-290 is or can be connected to the mobile phase, e.g., via suitable fluidic switches such as valves, in order to establish dynamic fluidic sealing, under the influence of the (respective) pressure of the mobile phase, in the flow path between lines 41 and 42 shown by way of example in FIG. 3, in which the mobile phase likewise flows or can flow.

First sealing element 280 is connected to or in stator 220. Second sealing element 285 is attached to drive 240, and third sealing element 290 is located axially between housing 260 and drive 240. The mobile phase can flow through each of sealing elements 280-290 and, as stated, can be used either individually or in any combination with each other. Likewise, other, corresponding sealing elements can also be used alternatively or in combination at a suitable point.

In another exemplary implementation, which is not shown here, the sealing element that generates or is intended to generate the axial force by expansion does not have its own connections to the mobile phase, for example parallel to lines 41 and 42, but is connected in series with the usual functions of an injection valve of injector 40, for example, and thus is always subjected to the highest possible pressure in the system, except in the case of a blockage. The sealing element may be connected in series with the flow path to be sealed.

Sealing elements 280-290 may be implemented by a microfluidic structure, such as based on a plurality of metal layers, which are joined to each other by diffusion bonding, as is described in detail for example in WO2017025857A1 by the same applicant, the entire contents of which are incorporated by reference herein. The microfluidic structure has at least one microfluidic channel through which the mobile phase flows or can flow. The microfluidic structure is configured so as to expand, or be able to expand, at least partially in the axial direction (i.e., in the direction of the sealing force F or FS), under the influence of the pressure of the mobile phase. Such microfluidic structures based on metal layers that are joined to each other are also called metal-microfluidic or MMF structures.

Figure 4A:
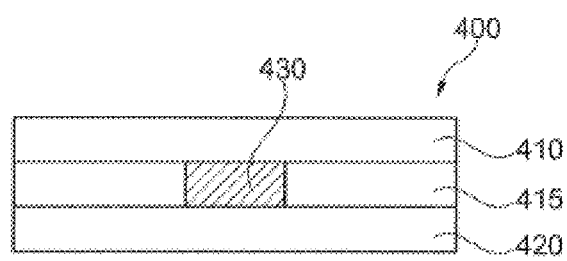
FIG. 4A is a sectional view of an example of a sealing element according to an exemplary implementation of the present disclosure.
Figure 4B:
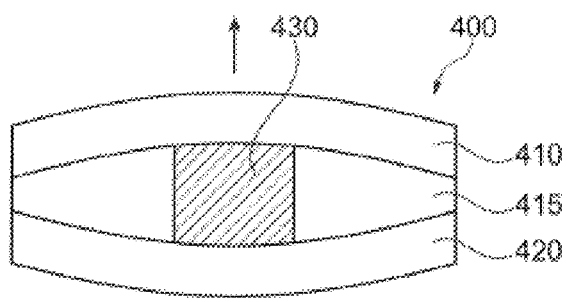
FIG. 4B is another sectional view of the sealing element illustrated in FIG. 4A.

FIGS. 4A and 4B illustrate, by way of example and in a sectional view, an exemplary implementation 400 of one or more of sealing elements 280-290. It shall be understood that this illustration is purely schematic in order to illustrate the mechanism of action of sealing elements 280-290. Sealing element 400 is made up of three metal layers 410, 415 and 420, which may be firmly joined to each other by diffusion bonding. A recess in metal layer 415 creates a channel 430, which can be seen in the direction of flow in the sectional illustration chosen here. Channel 430 comprises an entrance (not shown FIG. 4) and an exit (likewise not shown in FIG. 4) and the mobile phase is able to flow through the channel 430, with pump 20 being fluidly coupled to the entrance, and separation device 30 being coupled to the exit. The mobile phase has essentially the same pressure (in the schematic illustration according to FIG. 1) between pump 20 and separation device 30, which is then also essentially present in channel 430 accordingly.

In FIG. 4A, sealing element 400 is shown in a state in which the mobile phase does not flow through channel 430. FIG. 4B illustrates how sealing element 400 expands under the influence of the pressure of the mobile phase flowing through channel 430 in the direction of the shown arrow. The expansion shown here is deliberately exaggerated to better illustrate the effect. In fact, in an implementation according to FIG. 4, depending on the choice of material and the pressure conditions, sealing element 400 will only expand very little, e.g., a few microns, e.g., 50 to 200 µm, in the direction of the arrow. For example, by using multiple layers including multiple channels, the expansion in the direction of the arrow can be accordingly enlarged and enhanced.

Figure 5:
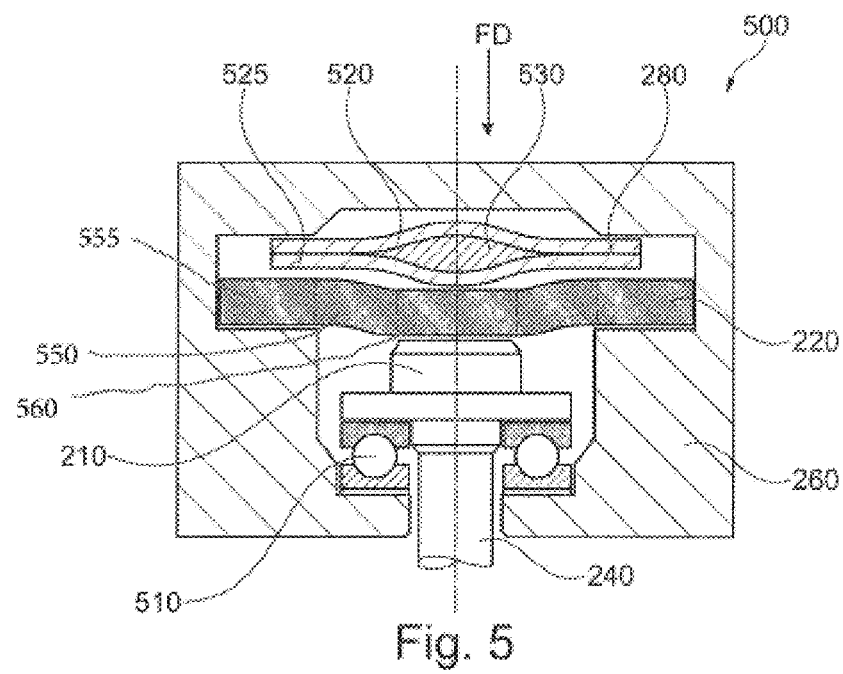
FIG. 5 shows a schematic and sectional illustration of an example of a valve according to another implementation of the present disclosure.

FIG. 5 shows, schematically and in a sectional illustration, an implementation of a valve 500, which essentially corresponds to valve 200 shown in FIGS. 2 and 3, so that reference numerals are used correspondingly. Rotor 210, which abuts against stator 220 and can be rotatably driven by drive 240, is located in housing 260. An axial thrust bearing 510 supports drive 240 in the axial direction.

First sealing element 280 (corresponding to the illustration in FIG. 3) is connected to stator 220 or acts thereon in the axial direction. First sealing element 280, in a manner similar to exemplary implementation 400 shown in FIG. 4, is also shown schematically and with exaggerated dimensions. First sealing element 280 is may be made up of several layers, only two layers 520 and 525 and a channel 530 enclosed by these layers 520 and 525 being shown in the schematic illustration according to FIG. 5. First sealing element 280 may be implemented by an MMF structure.

When the pressurized mobile phase flows through channel 530, channel 530 expands in the direction of the arrow and acts with a dynamic sealing force FD in the axial direction on stator 220, which in turn presses axially against rotor 210, so that, with suitable dimensioning of the dynamic sealing force FD, stator 220 and rotor 210 are situated opposite each other in a fluidly sealing manner.

In the implementation illustrated schematically in FIG. 5, stator 220 is designed and arranged or attached in valve 500 in such a way that an axial angular offset with respect to rotor 210 can be compensated for at least to a certain degree, and thus the effective surfaces of stator 220 and rotor 210 are situated parallel opposite each other or abut flat against each other. For this purpose, stator 220 is firmly connected to housing 260, e.g., by means of appropriate mechanical fasteners (such as, e.g., mounting holes 630 and 635 shown in FIG. 6). Furthermore, stator 220 is designed to be elastic insofar as it can be aligned elastically axially with respect to rotor 210, despite being rigidly connected to housing 260. For this purpose, in the exemplary implementation shown in FIG. 5, stator 220 is designed to comprise an elastic region 550, which is located between an attachment region 555 and a contact region 560. The attachment region 555 represents the region where stator 220 is attached to housing 260. Contact region 560 represents the region in which stator 260 abuts against rotor 210, i.e., in which the operative region of stator 220 required for the valve function is located.

Elastic region 550 is designed such that sealing element 280 can press contact region 560 flat against the corresponding contact surface of rotor 210, so that a possible axial angular offset between contact region 560 and rotor 210 is compensated for. In the schematic illustration according to FIG. 5, this is shown in exaggerated form by the (elastic) deformation or shape of elastic region 550.

In the exemplary implementation according to FIG. 5, rotor 210 is shown in valve 500 in an exactly axially aligned manner. Sealing element 280 is designed and arranged in such a way that, in the case of an axial angular offset of rotor 210 with respect to housing 260, contact region 560 of stator 220 is aligned axially with respect to rotor 210, so that contact region 560 is situated flat opposite the contact surface of rotor 210, and these can be pressed against each other (in a fluidly sealing manner). Sealing element 280 is laterally deformable as a result of channel 530 and can thus align itself elastically with contact between housing 530 and contact region 560 of stator 220 so that contact region 560 is axially aligned with rotor 210 and pressed thereagainst.

It is apparent from the aforementioned exemplary implementations that the respective sealing elements 280-290 press stator 220 and rotor 210 against each other by way of a dynamic sealing force FD. This dynamic sealing force FD depends on the particular pressure of the mobile phase, i.e., a higher pressure of the mobile phase results in a higher dynamic sealing force FD. On the other hand, the pressure of the mobile phase also acts in particular on the region to be sealed, in this case the contact region between stator 220 and rotor 210, since here the flow path runs between lines 41 and 42 in which the mobile phase is pumped. Accordingly, at a higher pressure of the mobile phase, the contact region between stator 220 and rotor 210 requires greater sealing (than at a lower pressure of the mobile phase). Sealing elements 280-290 thus act dynamically on the contact region between stator 220 and rotor 210, so that at a higher mobile phase pressure, which requires an increased sealing force in this contact region, a higher dynamic sealing force FD is also provided by sealing elements 280-290. Conversely, at a lower pressure of the mobile phase, where an accordingly lower sealing force is required in the contact region between stator 220 and rotor 210, sealing elements 280-290 also reduce the dynamic sealing force FD exerted on this contact region. This results in the dynamic sealing force of sealing elements 280-290 essentially following the pressure of the mobile phase, so that, at low pressures of the mobile phase, the dynamic sealing force FD is low, and at high pressures of the mobile phase, the dynamic sealing force FD is high. Accordingly, at low pressures of the mobile phase, the contact region between stator 220 and rotor 210 is not unnecessarily heavily loaded, which can lead to less wear and an extended longevity.

Figure 6:
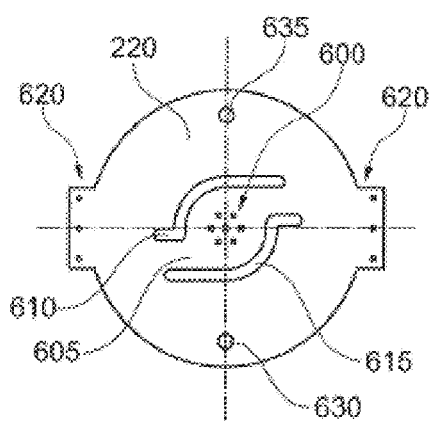
FIG. 6 is a plan view of an example of a stator according to an implementation of the present disclosure.

FIG. 6 shows an implementation of stator 220 in a plan view, such as can be used, for example, in the implementation according to FIG. 5. The stator 220 may be implemented in MMF technology. A plurality of ports 600 are centrally implemented in a middle region 605 of stator 220. Ports 600 each represent an open end to a respective flow path and cooperate with corresponding connecting elements (such as, e.g., grooves) of stator 210 in order to connect corresponding flow paths.

Middle region 605 (including ports 600) is embodied as a flexible region, which is accomplished by two recesses 610 and 615 in the exemplary implementation according to FIG. 6. The two recesses 610 and 615 allow—to a certain degree—a twisting (in particular a tilting) of middle region 605, such that middle region 605 abuts as flat as possible against rotor 210, even if stator 220 is twisted or tilted with respect to rotor 210.

Stator 220 furthermore comprises external ports 620; in the exemplary implementation according to FIG. 6, three ports 620 are shown each on the left and right sides of stator 220 by way of example, which may correspond to ports 230 in FIG. 2, that is to say, these are used for establishing an external fluidic contact with stator 220.

Stator 220 in the implementation according to FIG. 6 furthermore comprises two mounting holes 630 and 635 for mechanically coupling and/or fixing stator 220, e.g., with respect to housing 260. Of course, more or fewer than two mounting holes 630, 635 or other options known in the prior art for mechanical coupling and/or fixing can also be used accordingly.

Middle region 605 shown in FIG. 6 in this regard corresponds to contact region 560 shown in FIG. 5, while a region between recesses 610 and 615 and mounting holes 630, 635, which is not specified in more detail, corresponds to elastic region 550 shown in FIG. 5.

Figure 7:
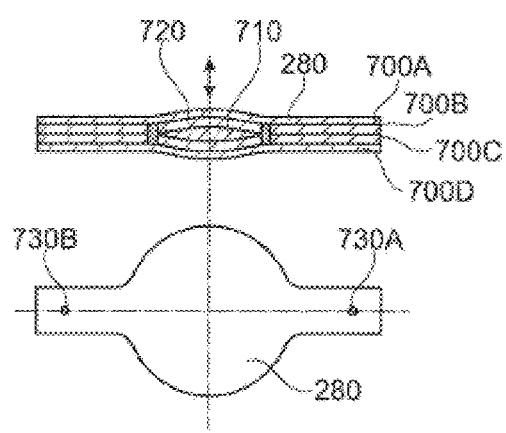
FIG. 7 is a sectional (top) and a plan (bottom) view of an example of a sealing element, as shown and used in FIG. 5, for example, according to an implementation of the present disclosure.

FIG. 7 shows an implementation of sealing element 280, as shown and used in FIG. 5, for example, in a sectional view (top) and a plan view (bottom). Sealing element 280 likewise may be implemented using MMF technology. According to the implementation shown in FIG. 4, sealing element 280 in FIG. 7 is composed of a plurality of metal layers 700, in the exemplary implementation shown there are four metal layers 700A-700D, which each may be firmly joined to each other by diffusion bonding. A channel 710 (corresponding to channel 430 of FIG. 4) is formed by suitable recesses in metal layers 700B and 700C, and a fluid such as the mobile phase can flow through. In the exemplary implementation according to FIG. 7, channel 710 is at least partially bordered by ceramic inserts 720, which can be inserted, for example, as auxiliary bonding parts during the bonding process. These ceramic inserts 720 are used in the manufacturing process and can prevent or reduce the sagging of the geometry.

In the plan view of sealing element 280 shown below in FIG. 7, two external ports 730A and 730B are furthermore apparent, which can be used for establishing an external fluidic contact of sealing element 280, so that, for example, the mobile phase enters sealing element 280 through connection 730A, moves through channel 710, and can exit through connection 730B.

In the sectional view (top of FIG. 7), the (axial) expansion (in the direction of the arrow) of channel 710 under the influence of the pressure of the mobile phase is again shown in an exaggerated manner in order to illustrate the basic effect of sealing element 280. The deflection resulting under the pressure of the mobile phase can be accordingly configured and enhanced by appropriate routing and/or configuration of channel 710 and/or by the provision of channels in several planes.

Figure 8:
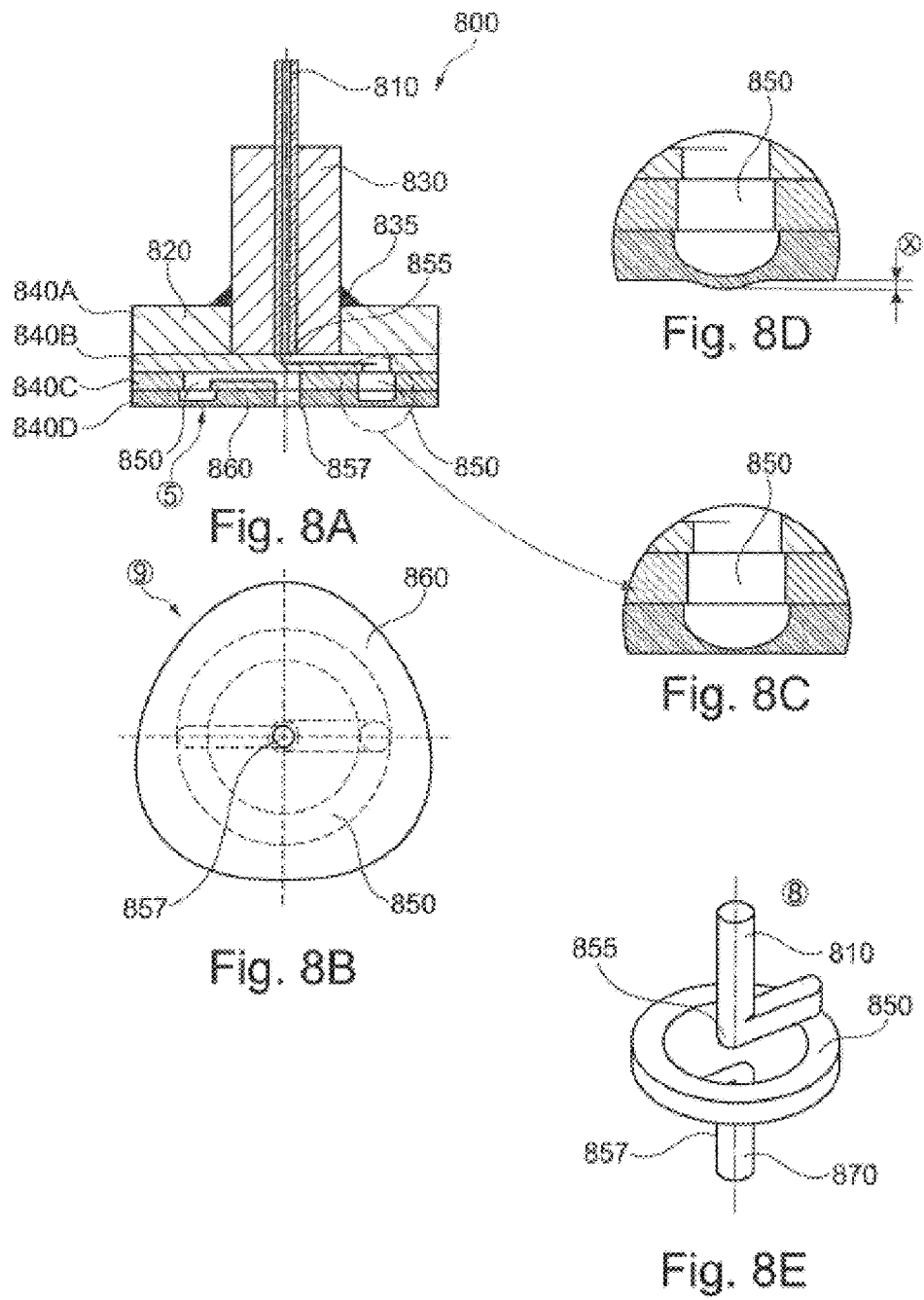
FIG. 8A is a sectional view of an example of an adaptive fitting according to an implementation of the present disclosure.
FIG. 8B is a bottom view of the adaptive fitting illustrated in FIG. 8A.
FIG. 8C is a view of an area enclosed by a dashed circle in FIG. 8A.
FIG. 8D is another view of the area enclosed by a dashed circle in FIG. 8A.
FIG. 8E is a perspective view of a channel structure of the adaptive fitting illustrated in FIG. 8A.

FIG. 8 illustrate an exemplary implementation of an adaptive fitting 800. Fitting 800 as shown is intended to fluidly connect a tubular capillary 810 (e.g., made of glass or metal) with a (e.g., disk-shaped) planar structure 820 and to be designed as a high pressure connection for pressures from 200 bar or greater and, for example between 1000 and 2000 bar. FIG. 8A shows fitting 800 in a sectional representation, and FIG. 8B shows a view of fitting 800 from beneath. FIGS. 8C and 8D show a section bordered by dashed lines in FIG. 8A. FIG. 8E shows the channel structure of the fitting 800 in a three-dimensional representation.

In detail, FIG. 8A shows capillary 810 as it is fluidly coupled and mechanically connected to the planar structure 820 via fitting 800. Capillary 810 is encased in a stabilizing tube (e.g., a socket) 830, which may be connected to planar structure 820 by means of laser welding (see weld seam 835).

Channel structure 820 is shown by way of example as being made up of four separate layers 840A-840D, although the number of layers may vary according to the implementation and design of channel structure 820 as appropriate. Corresponding recesses in layers 840 form a ring channel 850 located inside planar structure 820, through which a liquid medium such as the mobile phase can flow.

Channel structure 820 also comprises an entrance 855 and an exit 857, between which ring channel 850 extends or to which ring channel 850 is fluidly coupled, so that the mobile phase can enter channel structure 820 through entrance 855, be transported through ring channel 850, and exit through exit 857.

An end face 860 of planar structure 820, shown in FIG. 8A at the bottom and in a plan view in FIG. 8B, may be additionally coated with a sealant, e.g., TEFLON material (polytetrafluoroethylene or PTFE), to compensate for any surface defects.

The wall thicknesses of layers 840 in planar structure 820 are designed in such a way that a wall of ring channel 850 bulges outwardly under pressure, as is shown with an X in the enlarged partial illustration of FIG. 8C in comparison to the enlarged partial illustration of FIG. 8D. The X in FIG. 8D represents the bulging of ring channel 850 compared to the state without pressurization by the mobile phase shown in FIG. 8C.

The possible shape of the flown-through ring channel 850, including the feed line to the capillary 810 and a possible termination 870 out of the planar structure, is shown in FIG. 8E by way of example:

The contour of planar structure 820 can be circular or of constant width (orbiform), for example, in order to additionally prevent twisting the planar structure 820 e.g., upon tightening. Such an orbiform can possibly already be specified during diffusion bonding or can be created later by a mechanical processing step, which can possibly result in greater contour accuracy).

If end face 860 of fitting 800 shown in FIG. 8A abuts against another surface not shown in FIGS. 8, bulge X presses against this abutting surface when pressure is applied to ring channel 850 (by the mobile phase), with bulge X increasing with increasing pressure of the mobile phase. Accordingly, the planar structure 820 seals itself and adaptively by means of bulge X with respect to the abutting surface or enhances an existing static seal.

Instead of the individual connection shown in FIG. 8A, that is to say, for establishing only one fluidic connection, a corresponding multi-connector including a plurality of channels, each of which is individually sealed and possibly fed by only one pressure channel, can also be provided.

In the implementations shown in FIGS. 3-7, sealing structure (hereinafter also referred to as pressure force structure) 280-290, 400 is spatially separated from flow path 41, 42, at least in the region of flow path 41, 42 of flow element 200, 400 to be sealed by pressure force structure 280-290, 400. Accordingly, in these implementations, the pressure force structure 280-290, 400 is not part of the flow path 41, 42, at least in the region of the flow path 41, 42 that is to be sealed by the pressure force structure 280-290, 400.

Flow path 41, 42 shown only schematically in FIGS. 3-7 typically comprises an outer wall, within which the mobile phase can flow. Pressure force structure 280-290, 400 is then spatially separated from the outer wall and is located outside the flow path 41, 42 and the outer wall thereof. Typical flow paths can be capillaries or microfluidic structures. In the case of capillaries, the wall is implemented by the capillary itself, i.e., the capillary is the wall within which the mobile phase can flow. In the case of microfluidic structures, such transformations are typically implemented by corresponding channels, e.g., within a substrate, which is possibly made up of a plurality of layers that are joined to each other.

Figure 9:
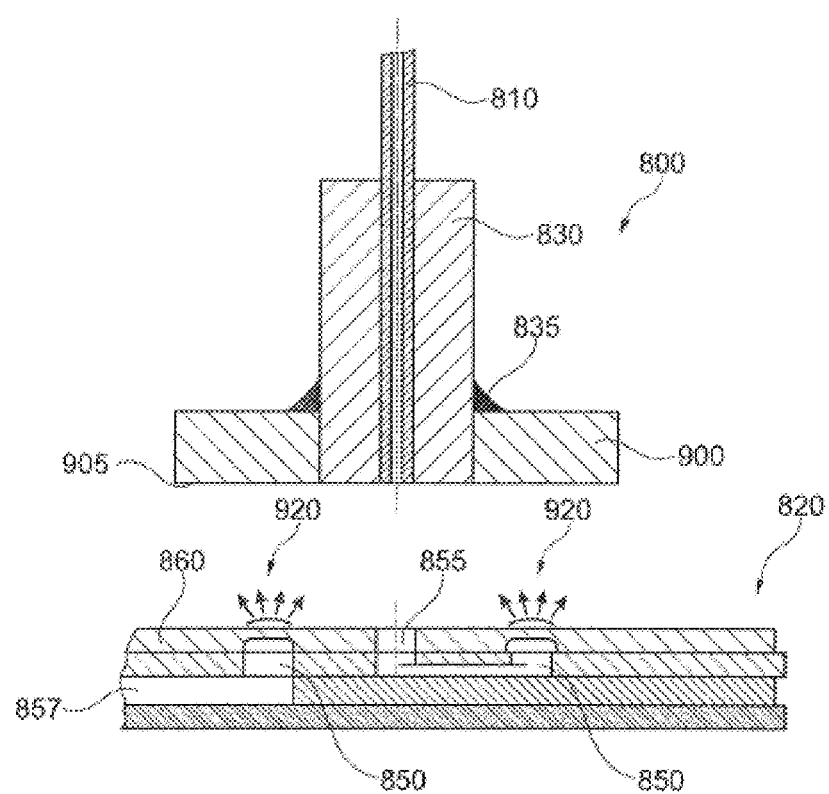
FIG. 9 is a sectional view of another example of a fitting according to an implementation of the present disclosure.

FIG. 9 shows another implementation of a fitting 800. The upper region in FIG. 9 represents—corresponding to the implementation according to FIG. 8—a tubular capillary 810, which is encased in stabilization tube 830 and is firmly connected to a planar carrier 900 by means of laser welding (represented by weld seam 835).

Planar structure 820 is to be pressed with its end face 860 (which is shown in FIG. 9 on the upper side of the planar structure 820) against an underside 905 of the planar support 900 in order to connect the entrance 855 (to the channel structure of planar structure 820) to capillary 810 in a fluidically sealing manner. Ring channel 850 of planar structure 820 in FIG. 9 is configured in such a way that, in the region of entrance 855, there is a bulge 920, shown schematically in FIG. 9, pressing against underside 905 of planar carrier 900, which in turn acts in a dynamic fluidically sealing manner. Exit 857 is shown only schematically in FIG. 9 as a lateral exit.

Planar structure 820 of the implementations according to FIGS. 8 and 9 can represent a part (e.g., a stator or a rotor) of a rotary valve or a mixer, for example.

FIG. 10 schematically represent a further implementation of valve 500, similar to the implementations according to FIGS. 2 and 3 and in particular according to FIG. 5, so that reference numerals are used accordingly. FIGS. 10A-10D schematically represent the implementation of valve 500 in a sectional representation, while FIG. 10E shows stator 220 in both a sectional representation and a view from beneath. FIGS. 10A-10D illustrate, in a deliberately exaggerated illustration, different operating states of valve 500, as will be explained in more detail hereafter.

In all of FIGS. 10A-10D, valve 500 comprises housing 260, which in the implementation selected here is in two parts and comprises a stator element 1000 and a rotor element 1010, which are connected to each other in a known manner, e.g., by way of screwing, for example detachably, but fixed in an adjustable/selectable manner. Dividing housing 260 into two or more elements may result in a simple manufacturing process, but it is apparent that a one-piece variant of housing 260 can also be provided accordingly In the implementations of FIGS. 10, stator element 1000 accommodates stator 220 and first sealing element 280, also referred to hereafter as an element for hydraulic pressure force generation or pressure force element 280. Furthermore, a transmission element 1020 can be provided between stator element 1000 and pressure force element 280, which transmits the force between elements 280 and 220 and at the same time homogenizes the pressure force over the bearing surface. Likewise, a flat abutment surface for stator 220 can be created by transmission element 1020. Transmission element 1020 may be designed to be rigid, in particular in connection with the "hydraulic cushion" of sealing element 280. When using an adjusting screw, the transmission element 1020 can also be designed to be elastic.

Corresponding fluidic channels are shown (schematically) in stator element 1000 in order to make fluidic contact both with first sealing element 280 and with stator 220 within the meaning of supply lines and discharge lines, with several supply lines and discharge lines also being able to be provided depending on the implementation, in particular for stator 220, as is well-known in the prior art. It should also be taken into consideration that the terms supply line and discharge line are to be understood within the meaning of a respective operating state, i.e., the fluid is supplied to the particular element through the supply line, and the fluid is discharged from the particular element through the discharge line. Correspondingly, in a different operating state, a fluidic contact previously used as a supply line can then function as a discharge line. In the schematic illustration of FIGS. 10, stator 220 is fluidically coupled to a supply line 1030A and a discharge line 1030B, and first sealing element 280 is fluidically coupled to a supply line 1040A and a discharge line 1040B.

The fluidic coupling of stator 220 (preferably e.g., for the fluidic routing of the mobile phase) is also only shown schematically here with a first channel 1050A, which is fluidically coupled to supply line 1030A and has a port 1060 situated opposite rotor 210, and a second channel 1070A, which is fluidically coupled to discharge line 1030B and has a port 1080 situated opposite to rotor 210.

Rotor element 1010 accommodates rotor 210, which, according to the implementation in FIG. 5, can be rotated by drive 240 in a rotational movement and may be mounted by way of axial thrust bearing 510. According to the above, rotor 210 can comprise suitable connecting elements, such as, e.g., grooves, for example, so as to—depending on the rotational position (of rotor 210 with respect to stator 220)—connect ports 1060 and 1080 fluidically with each other, or not.

What is not shown in this illustration is that rotor 210 can have a rotation lock with respect to drive 240 which, according to the known prior art, can be implemented as a pin connection (e.g., a rotor—rotor shaft connection via three or more pins) or any other geometrically interlocking connection.

Figure 10A:
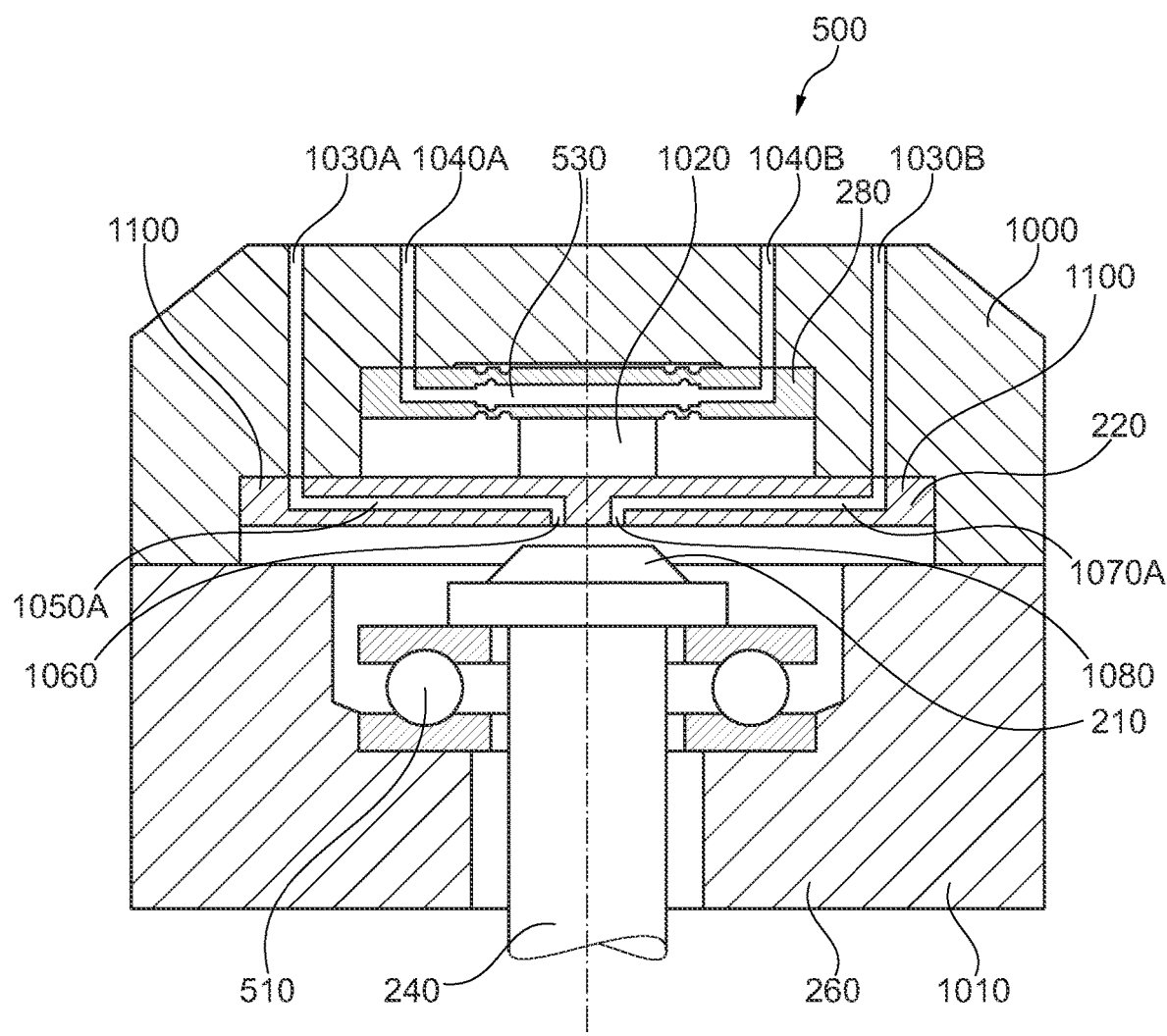
FIG. 10A is a schematic, sectional view of an example of a valve according to an implementation of the present disclosure.
Figure 10B:
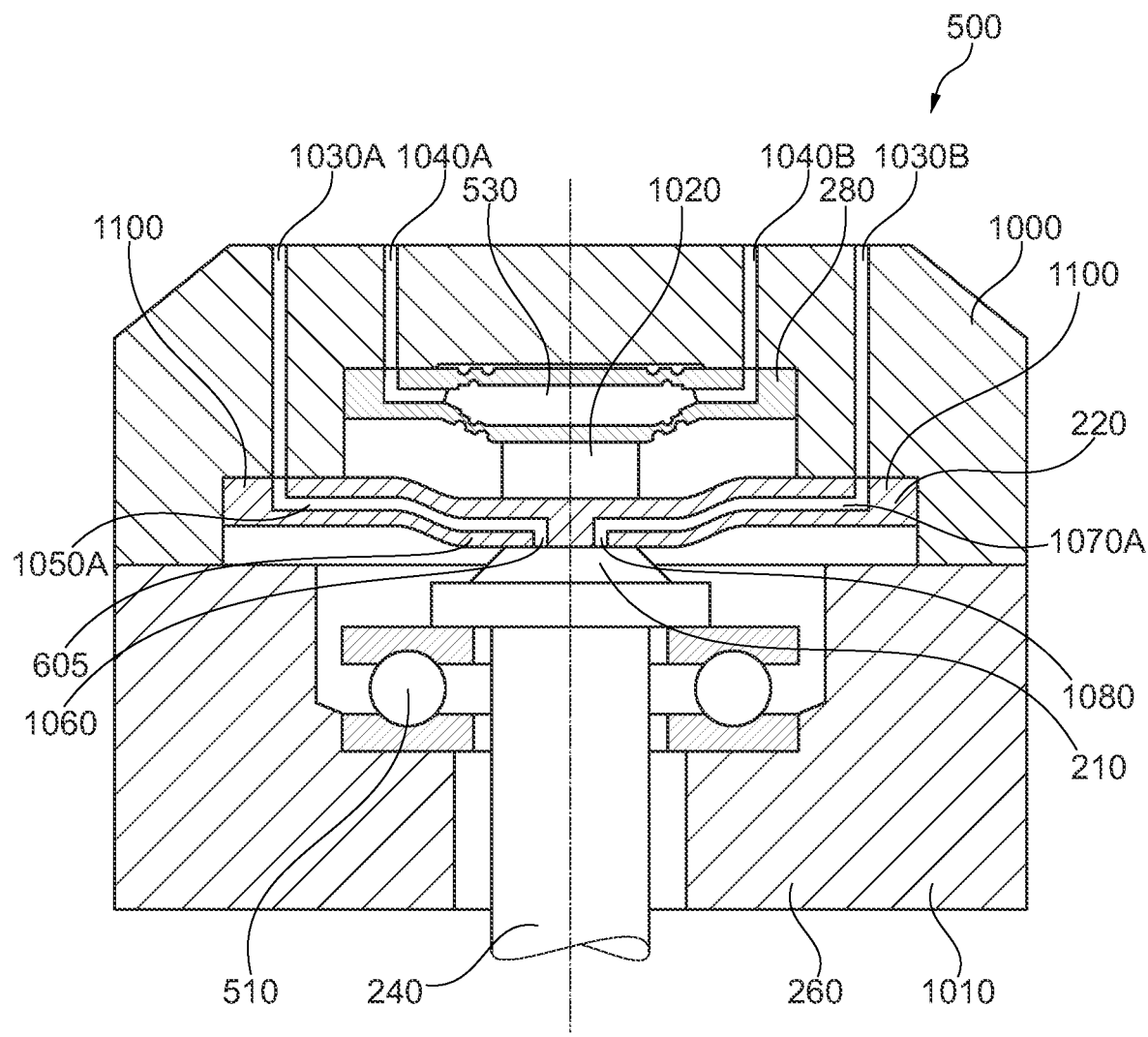
FIG. 10B is another schematic, sectional view of the valve illustrated in FIG. 10A.
Figure 10C:
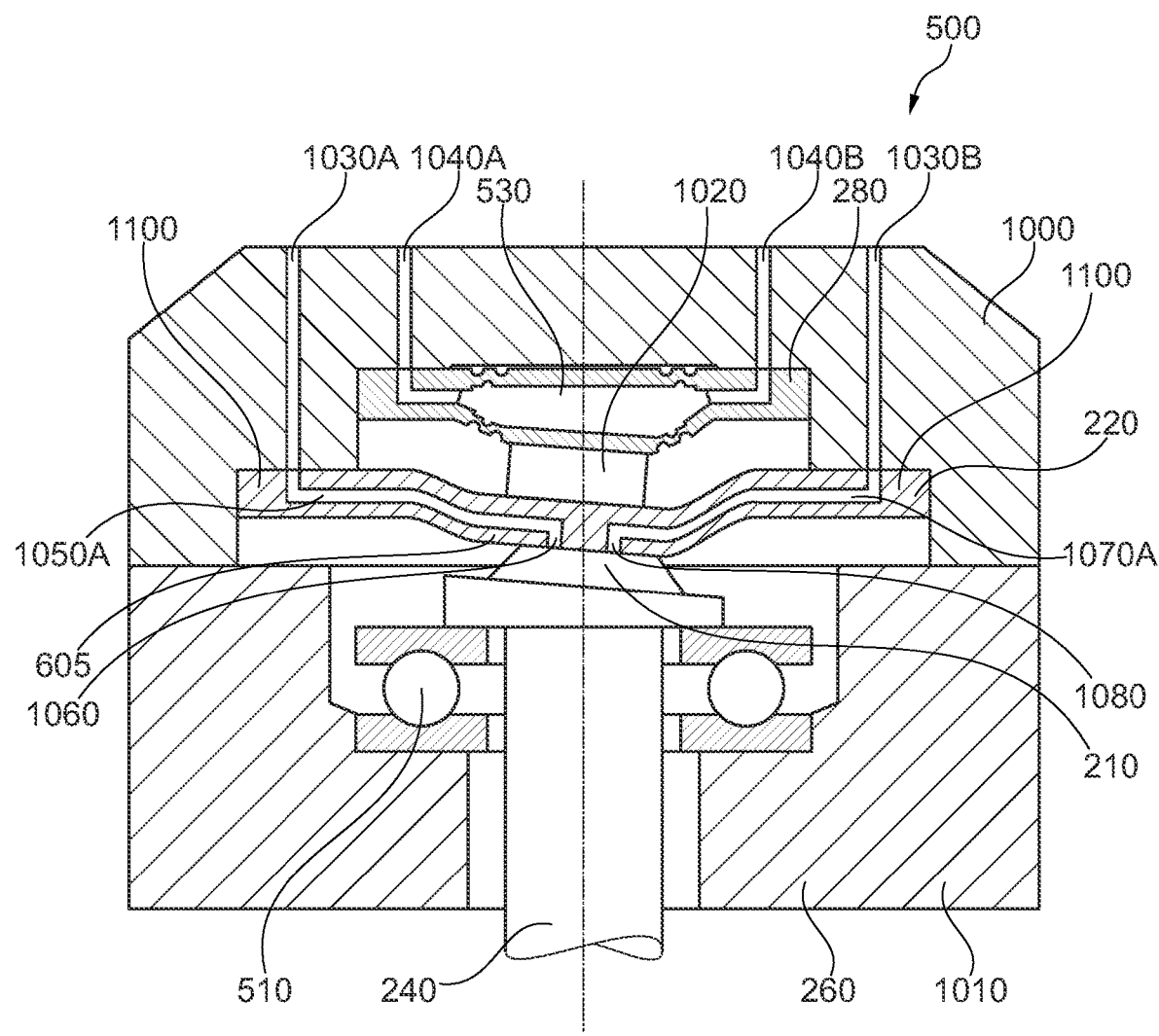
FIG. 10C is another schematic, sectional view of the valve illustrated in FIG. 10A.
Figure 10D:
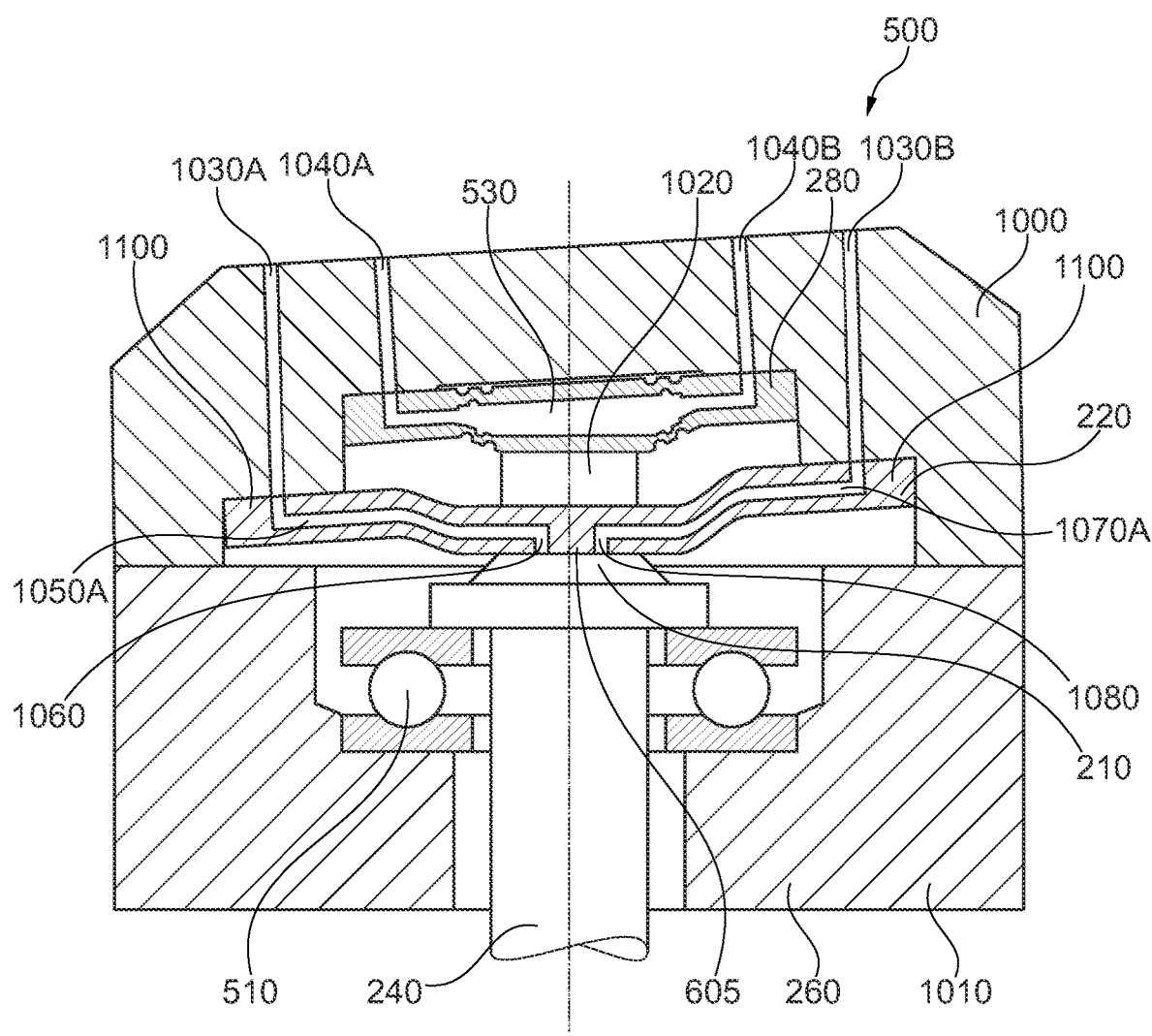
FIG. 10D is another schematic, sectional view of the valve illustrated in FIG. 10A.
Figure 10E:
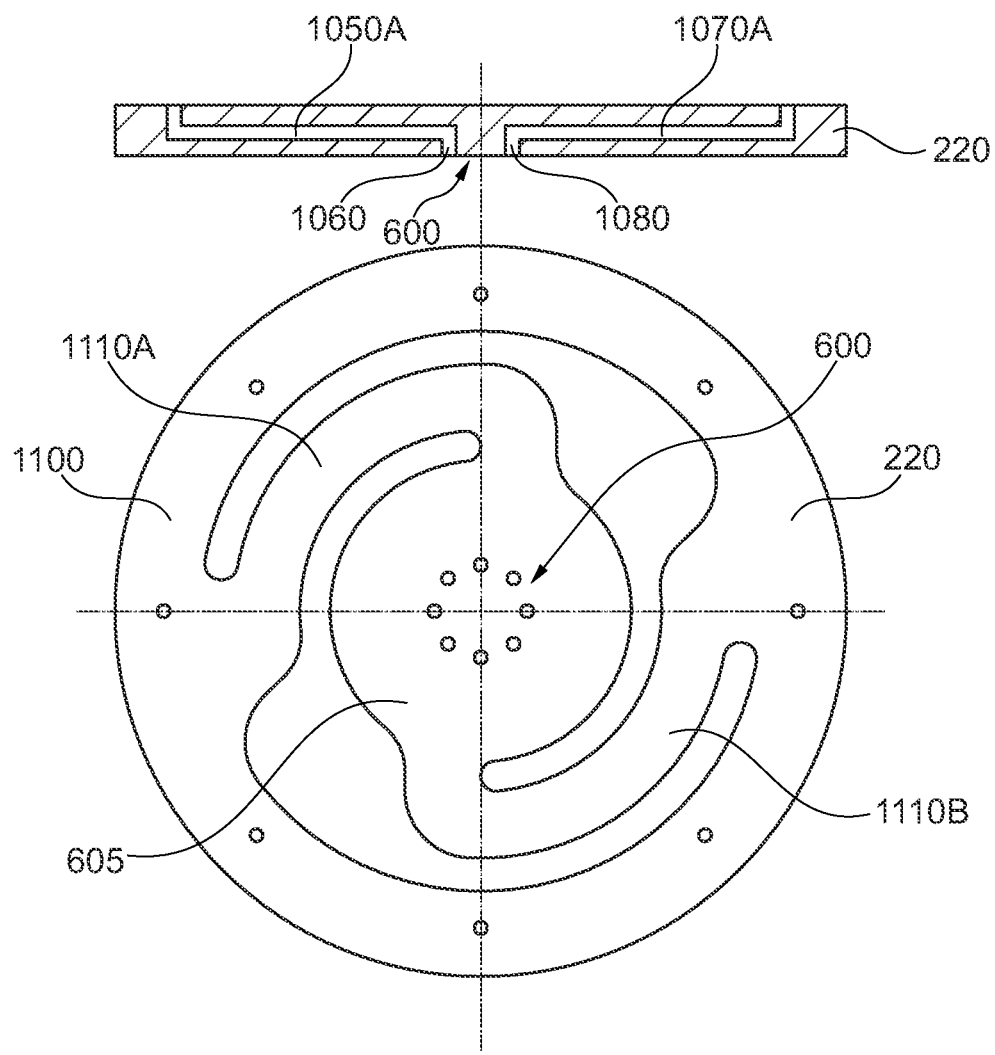
FIG. 10E is a sectional and bottom view of an example of a stator of the valve illustrated in FIG. 10A, according to an implementation of the present disclosure.

FIG. 10E shows—separate from valve 500—stator 220 also in a schematic plan view, in addition to the sectional illustration shown in FIGS. 10A-D, so that both ports 1060 and 1080 (corresponding to the implementation of FIG. 6) and interface ports 1050A and 1070A are shown. Preferably, stator 220 can be implemented in MMF technology. The plurality of ports 600 shown schematically in the middle region 605 includes ports 1060 and 1080 shown by way of example, and each represents an open end to a fluidic flow path.

In addition to middle region 605 (corresponding to FIG. 6), which includes ports 600, stator 220 comprises an outer ring region 1100 and two webs 1110A and 1110B, which each extend between the middle region 605 and the outer ring region 1100 and are connected thereto. Only one web or more than the two webs 1110 shown here can also be implemented, and of course these webs 1110 can also have a different shape than that shown here. The fluidic connections between ports 600 and interface ports 1050A and 1070A in the outer ring region 1100 run in these webs 1110A and 1110B.

Similar to the implementation according to FIG. 6, middle region 605 can be moved elastically with respect to outer ring region 1100 by webs 1110A and 1110B of the implementation according to FIG. 10E and is therefore embodied as a flexible region, so that middle region 605 can be displaced with respect to outer ring region 1100, in particular in the axial direction (of valve 500). Furthermore, this flexible structure also allows twisting/tilting of middle region 605 with respect to outer ring region 1100, i.e., the surface of middle region 605 that abuts against rotor 210 can be angled/tilted with respect to the surface in which outer ring region 1100 is located. This will also be further clarified hereafter.

FIG. 10A shows valve 500 in a state in which no fluid (such as the mobile phase) flows through first sealing element 280 or this fluid is not pressurized or is pressurized only to a small degree, so that first sealing element 280 is not expanded, or is expanded only to a small extent, in the axial direction of valve 500. In this state, stator 220 is not connected, or is connected only to a small degree, to rotor 220, i.e., stator 220 either does not abut against rotor 210 (as in FIG. 10A, with the distance shown being exaggerated) or only abuts against rotor 210 with a small axial force. This state is only shown here to clarify the mechanism of action.

FIG. 10B shows valve 500 in a state in which the fluid acting on the pressure force element 280 leads to a bulging of channel 530 in the axial direction of valve 500, and thus to an axial enlargement of pressure force element 280. Due to this enlargement of pressure force element 280, stator 220 is now pressed against rotor 210 by means of transmission element 1020, or to put it more precisely, middle region 605 of stator 220 is pressed against the corresponding abutment surface of rotor 210. From the exaggerated illustration, which was deliberately chosen for better illustration, it is also apparent that middle region 605 is deflected axially (in the direction of rotor 210) with respect to outer ring region 1110 of the stator, which is firmly connected to stator element 1000. The pressurization of pressure force element 280 allows the axial enlargement thereof, and thus the contact pressure against rotor 210, to be influenced or controlled. Accordingly, the sealing force of stator 220 with respect to rotor 210 can be controlled by controlling the fluidic pressure that is present in channel 530 of pressure force element 280.

FIG. 10C shows, by way of example and again in an exaggerated illustration, which is deliberately chosen for the sake of clarity, the effect of an axial angular offset between rotor 210 and stator 220, and how this can be compensated for in the implementation according to FIG. 10. Rotor 210 is slightly tilted with respect to the axis of valve 500, e.g., as a result of tolerances, wear, incorrect adjustment, and the like. Due to the elastic design of stator 220, middle region 605 can move and/or rotate elastically with respect to outer ring region 1100. Furthermore, pressure force element 280 is also designed in such a way that channel 530 can spread or bulge differently in the axial direction, similarly to a "hydraulic cushion" that can align, with contact, between opposing abutment surfaces, which are not parallel to each other, but have a certain angular offset.

In the example shown in FIG. 10C, the axial angular offset of rotor 210 (with respect to the axis of valve 500) affects pressure force element 280 via stator 220 (and the optional contact element 1020), so that pressure force element 280 has radially different thicknesses (in the axial direction), as shown in FIG. 10C. Accordingly, the effective surfaces of rotor 210 and stator 220 can (continue to) be pressed firmly, and thus in a fluidically sealing manner, against each other.

FIG. 10D again shows, by way of example and in a deliberately exaggerated manner, how an axial angular offset between rotor 210 and stator 220 can be compensated for, with stator element 1000 now being angled axially with respect to rotor element 1010 in the exemplary implementation according to FIG. 10D, e.g., again as a result of tolerances, wear, incorrect adjustment, and the like. According to FIG. 10C, the elastic design of stator 220 can compensate for this axial angular offset, so that the middle region 605 can (continue to) abut flat against the abutment surface of rotor 210. Here too, the angular offset manifests itself in a variation in the radial thickness of pressure force element 280, and channel 530 of pressure force element 280 acts as a hydraulic cushion and compensates for the axial angular offset.

The dynamic sealing explained and shown in the previous exemplary implementations may be carried out by the carrier medium to be sealed, namely the mobile phase of liquid separation system 10 itself. Alternatively, of course, another flowing medium could also be used in order to achieve the increase in volume according to the present disclosure of the particular sealing element. However, this typically requires a separate pumping mechanism and, possibly appropriate pressure control to achieve the desired dynamic sealing.

Instead of or in addition to pump 20, another auxiliary pump (not shown in the figures) can be used to pump the fluid (in particular the mobile phase) that causes the increase in volume of the particular sealing element.

The exemplary implementations shown above, in which a sealing element is used to fluidically seal a flow path, can in part have an effect equivalent to mechanical configurations, such as, e.g., a toggle lever or a mechanism for varying the valve contact pressure as described in U.S. Ser. No. 10/428, 960, the entire contents of which are incorporated herein by reference. Such a toggle lever can be used, for example, in a valve (e.g., according to FIG. 2) to statically and/or dynamically press the rotor against the stator. However, the implementations according to the present disclosure allow an automatic adaptive and dynamic adjustment to the particular pressure conditions in the flow path to be sealed, i.e., increased pressure in the flow path to be sealed automatically leads to an increased sealing force by the sealing element, insofar as the medium flowing in the flow path to be sealed is also used to generate the sealing force in the sealing element, e.g., by using the mobile phase of high-performance chromatography system 10 in the particular sealing element, e.g., sealing elements 280-290, to generate the adaptive and dynamic sealing force.

In the implementations shown in FIGS. 8-9, the sealing structure or pressure force structure is part of the flow path in each case, at least in the region of the flow path of the flow element that is to be sealed by the sealing structure/pressure force structure. The flow path is sealed by a bulging effectuated by the pressure of the mobile phase in a section of the flow path, and by this bulge abutting and pressing against another surface, which may be fixed spatially or at least may only move to a less degree in the direction of the bulge than the bulge itself is deflected, so that, as a result, the bulge is pressed against this surface.

FIGS. 11-14 show further implementations of valve 500, likewise schematically and in sectional representations, similar to the implementations shown, in particular according to FIG. 10, so that what was said above can be applied accordingly here. For the sake of simplification and a clearer presentation, the differences are primarily to be presented and explained hereafter.

According to the description concerning FIGS. 10, stator 210 is designed to be elastically movable in each of the exemplary implementations according to FIGS. 11-14, so that middle region 605 can be elastically displaced and/or twisted to a certain degree with respect to the outer ring region 1100. This allows, as is shown and described in detail with respect to FIG. 10, to compensate for, in particular, axial angular misalignments between the axially arranged elements of valve 500, such as, e.g., an axial angular offset between housing 260 and/or rotor 210 with respect to stator 220.

In contrast to the implementation according to FIG. 10 in particular, in the implementations according to FIGS. 11-14, the middle region 605 of stator 220 is pressed against the opposite effective surface of rotor 210 not by (hydraulic) pressure force element 280, but by another, for example mechanical, mechanism, as shown hereafter.

Figure 11:
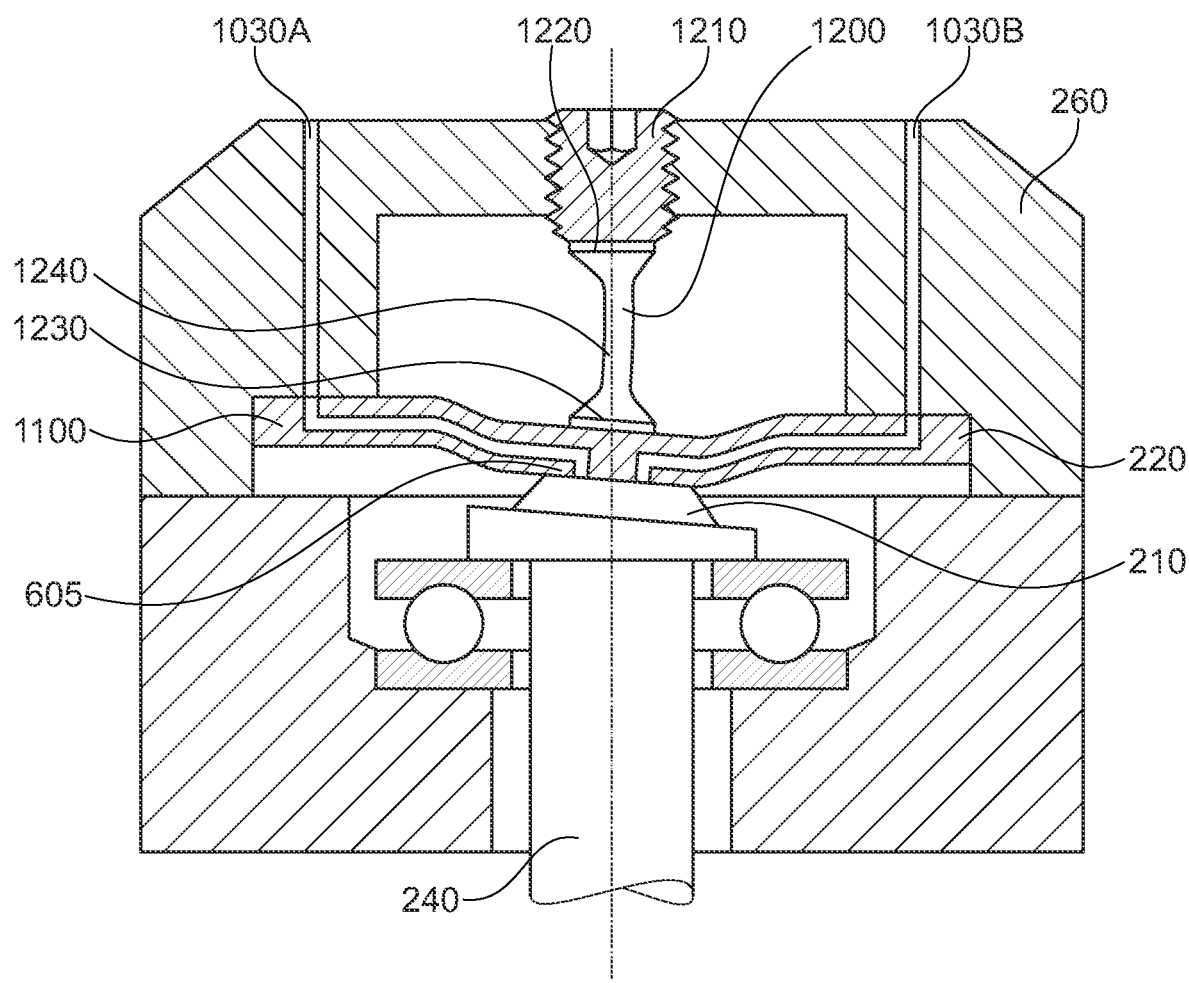
FIG. 11 is a schematic, sectional view of an example of a valve according to another implementation of the present disclosure.

In FIG. 11, an at least partially elastic rod 1200 is arranged between stator 220 and housing 260. An axial pressing mechanism 1210 (e.g., a corresponding screw mechanism, as is shown by way of example), which may be connected to housing 260, can be provided in order to position rod 1200 axially with respect to stator 220 and, for example, to press stator 220 axially firmly with respect to rotor 210.

Rod 1200 comprises an upper side 1220, a lower side 1230 and an elastic region 1240 therebetween. Upper side 1220 is used for rod 1200 to abut against housing 260 or axial pressing mechanism 1210, while lower side 1230 is used for abutting against stator 220. Elastic region 1240 is configured so as to be elastically bendable, at least to a certain degree, so that an axial angular offset can be compensated for by this bending, e.g., as shown in FIG. 11, an axial angular offset between rotor 210 and housing 260. Due to the elastic design of stator 220, middle region 605 can follow and compensate for the axial angular offset together with the elastic bending of elastic region 1240, so that the effective surfaces of stator 220 and rotor 210 can be pressed on parallel to each other. Rod 1200 may be made of an elastic material having sufficient compressive strength, such as, e.g., steel, alternative suitable metal alloys, composite materials, plastic materials, elastomers or ceramics. In principle, all materials that are either elastic by virtue of the property of the material or become elastic as a result of an appropriate geometric design can be used.

Figure 12:
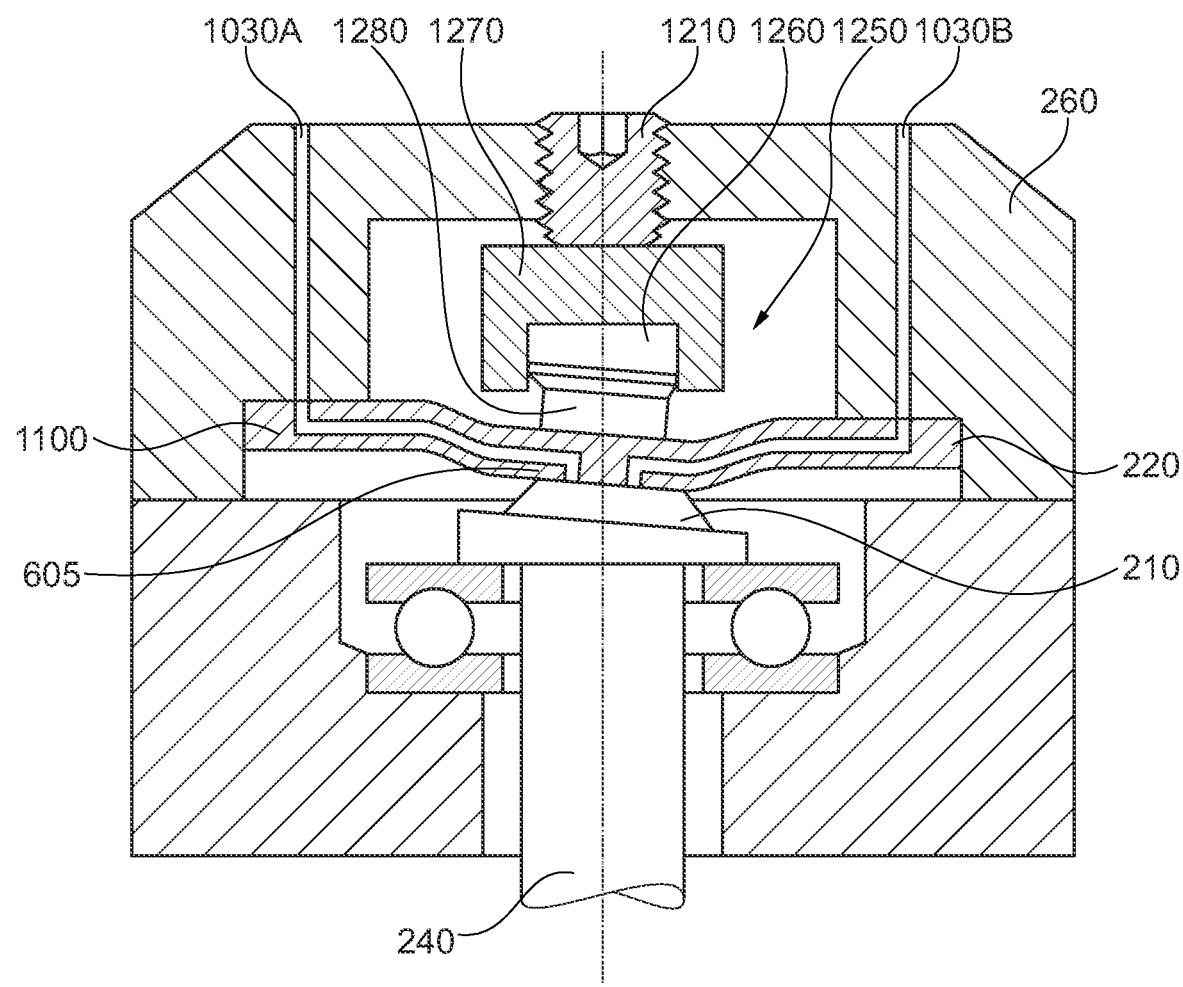
FIG. 12 is a schematic, sectional view of an example of a valve according to another implementation of the present disclosure.

FIG. 12 shows and illustrates, instead of elastic rod 1200 shown in FIG. 11, a compensating arrangement 1250, which allows an axial angular offset to be compensated corresponding to the effect of elastic rod 1200. Compensating arrangement 1250 is made up of an elastic and substantially incompressible cushion 1260, which is mounted in a frame 1270, for example. A pressing element 1280 is provided between cushion 1260 and stator 220. Elastic cushion 1260 allows angular compensation by being able to assume different thicknesses in the radial direction, with an overall volume remaining virtually constant, and thereby being able to adjust to an angular offset that continues via pressing element 1280 to compensation arrangement 1250. Elastic cushion 1260 may be made up of a permanently elastic but incompressible plastic material (e.g., polyurethane), but also of a plastically easily deformable material (e.g., PTFE). Liquids that have a high viscosity and surface tension are likewise conceivable. In addition to sealing, pressing element 1280 assumes the same tasks as transmission element 1020 from FIG. 10.

According to the implementation according to FIG. 11, compensating arrangement 1250 in FIG. 12 can also be positioned in the axial direction by a corresponding axial pressing mechanism 1210 and, possibly, be preloaded with respect to stator 220.

Figure 13A:
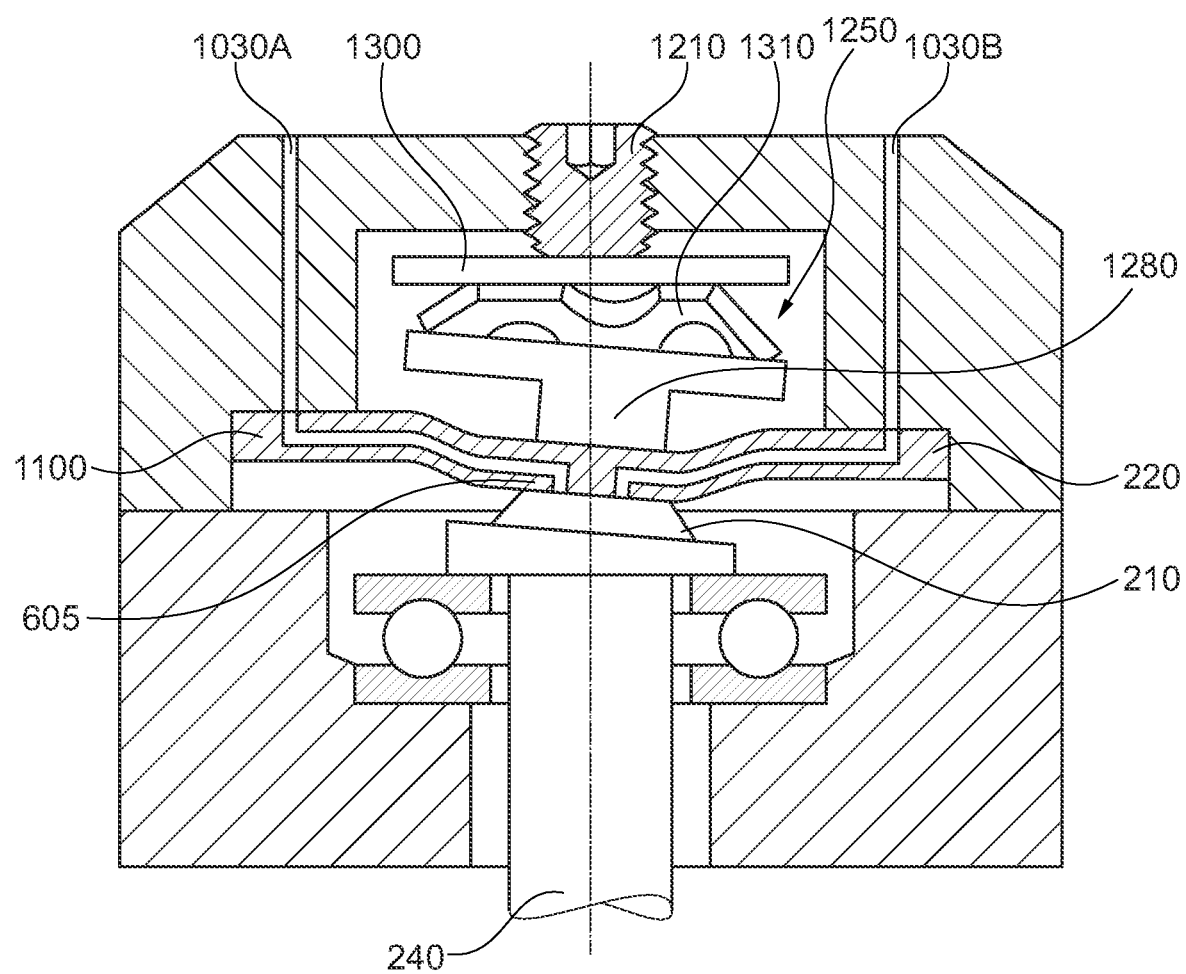
FIG. 13A is a schematic, sectional view of an example of a valve according to another implementation of the present disclosure.
Figure 13B:
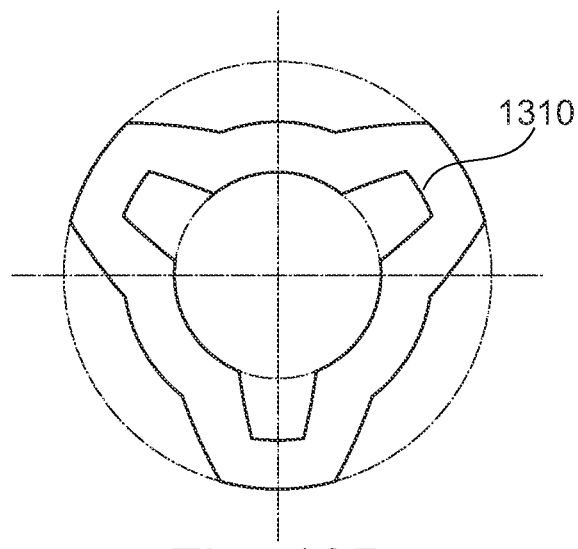
FIG. 13B is a plan view of an example of a spring element of the valve illustrated in FIG. 13A, according to an implementation of the present disclosure.

FIG. 13A shows a further implementation of compensating arrangement 1250. This arrangement is again made up of pressing element 1280 which, during operation, abuts against stator 220 and can press the same against rotor 210. Compensating arrangement 1250 furthermore comprises an upper contact element 1300 and a spring element 1310, which is located between pressing element 1280 and upper contact element 1300. FIG. 13B shows an implementation of spring element 1310, here e.g., a cloverleaf disk spring, in an axial plan view. The shape of spring element 1310 can be essentially freely chosen, as long as this elastically allows axial angling between pressing element 1280 and upper contact element 1300, as shown schematically in FIG. 13A.

Figure 14A:
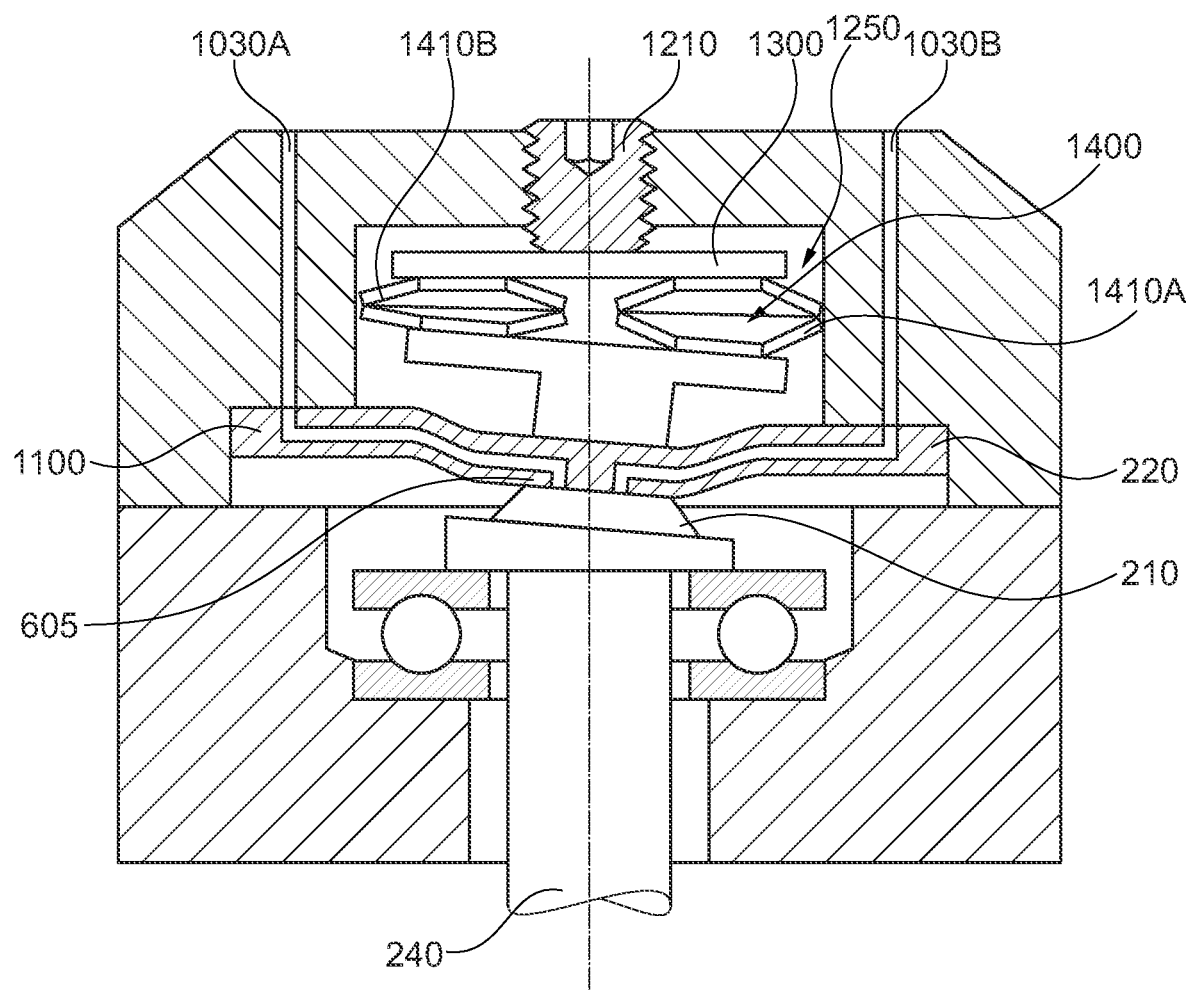
FIG. 14A is a schematic, sectional view of an example of a valve according to another implementation of the present disclosure.
Figure 14B:
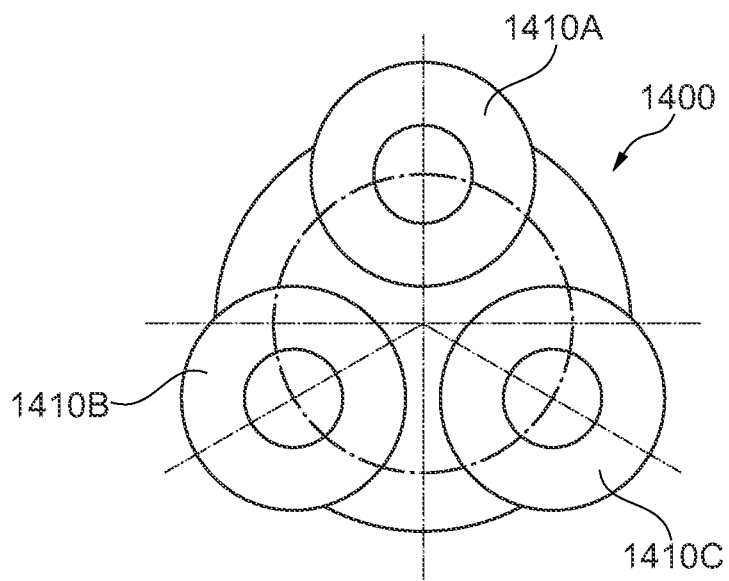
FIG. 14B is a plan view of an example of a spring element of the valve illustrated in FIG. 14A, according to an implementation of the present disclosure.

FIG. 14A shows a further implementation of compensating arrangement 1250. Similar to the implementation according to FIG. 13, compensating arrangement 1250 is made up of pressing element 1280, which, during operation, abuts against stator 220 and can press the same against rotor 210, and furthermore comprises upper contact element 1300 and a spring structure 1400, which is located between pressing element 1280 and upper abutment member 1300. FIG. 14B shows an implementation of spring structure 1400, here, for example, disk springs arranged in a circular manner, in an axial plan view. In this implementation, spring structure 1400 comprises three spring elements 1410A-1410C, for example, however, the number and shape thereof can be essentially freely chosen, as long as this elastically allows axial angling between pressing element 1280 and upper contact element 1300, as shown schematically in FIG. 14A.

Figure 15:
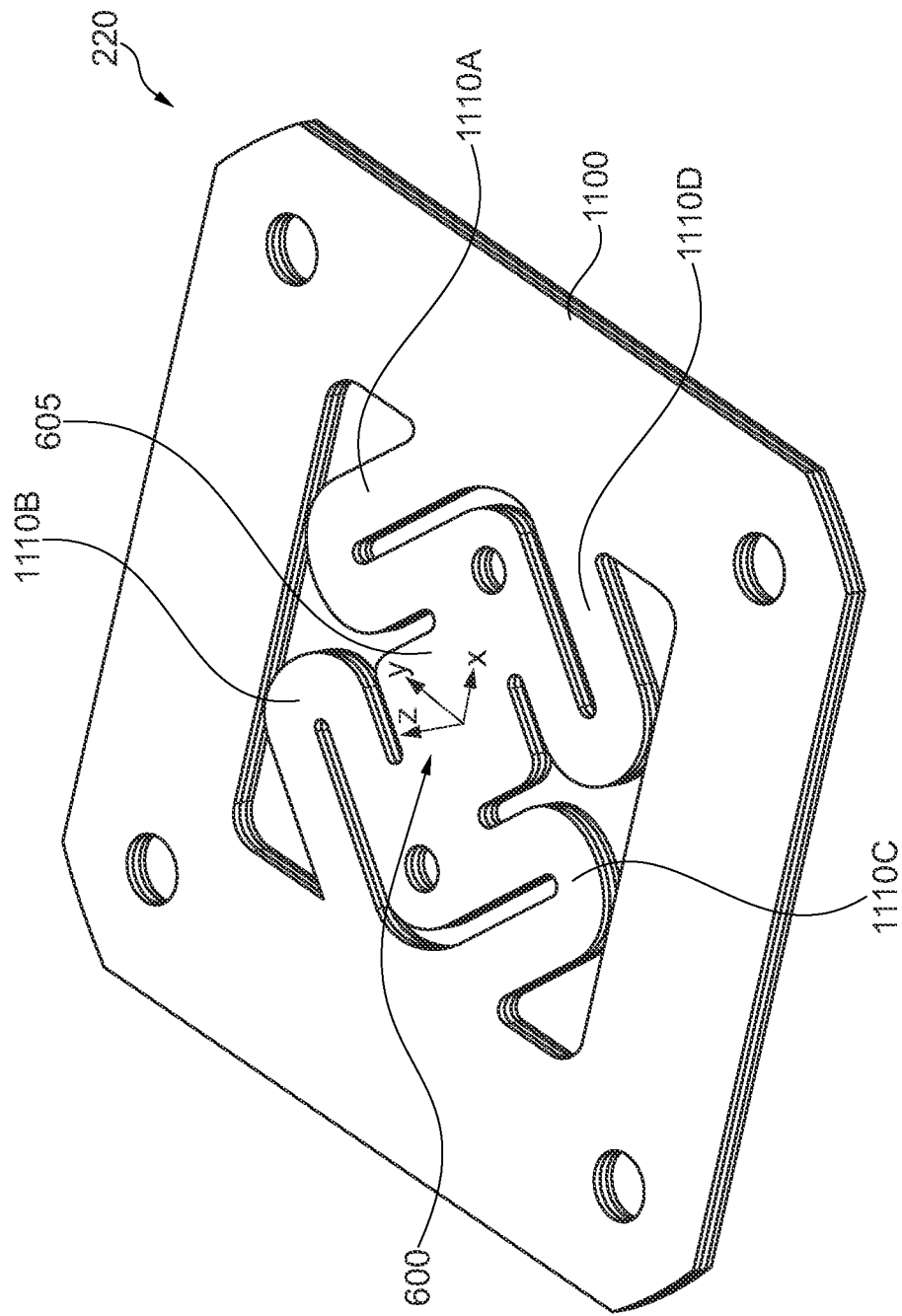
FIG. 15 is a schematic, perspective view of an example of a stator according to another implementation of the present disclosure.
Figure 16:
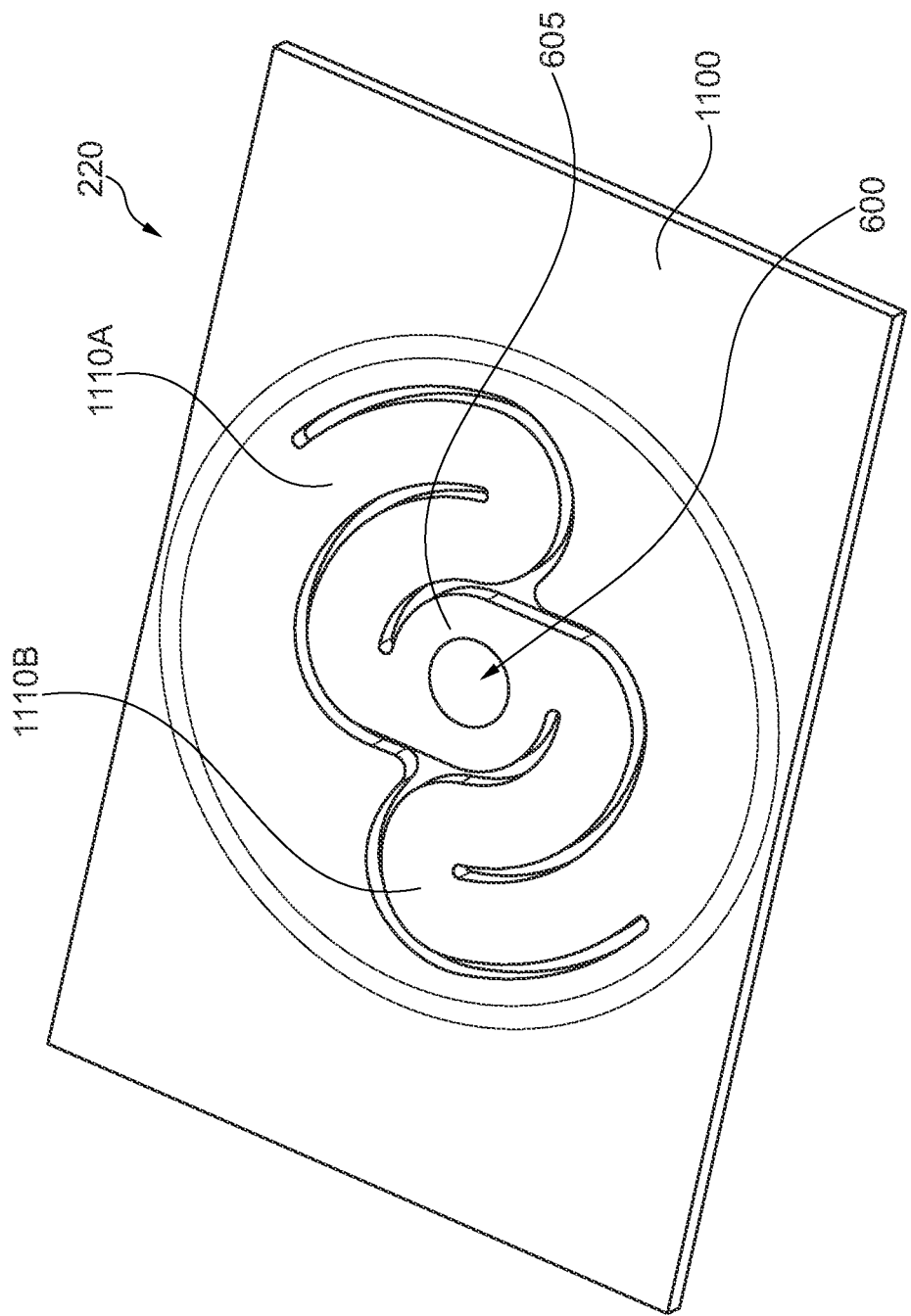
FIG. 16 is a schematic, perspective view of an example of a stator according to another implementation of the present disclosure.

FIGS. 15-17 show, schematically and separate from valve 500, further implementations of stator 220 in a three-dimensional view. These implementations are intended to show, by way of example, that there are virtually unlimited possibilities in terms of the design of elastic stator 220, provided that middle region 605 is able to move elastically with respect to outer ring region 1100. The exact shape may result from the particular application as well as the materials and manufacturing processes used. In particular the aforementioned MMF technology for the production of these elastic stators 220 may be advantageous in this case.

The implementation according to FIG. 15 comprises four webs 1110A-D, which each and symmetrically to each other connect middle region 605 to outer region 1100 in a curved manner and thus allow an elastic movement of middle region 605 with respect to outer region 1100.

The implementation according to FIG. 16 comprises two webs 1110A-B, which, likewise in a curved manner and symmetrically to each other, elastically connect middle region 605 to outer region 1100.

In the implementation of FIG. 17, webs 1100 are complex and interwoven and designed so as to cooperate with each other. This also leads to an elastic connection between middle region 605 and outer region 1100.

The invention claimed is:

1. A valve for a high-performance chromatography system for separating components of a sample liquid introduced into a mobile phase, the valve comprising:
 a first valve element; and
 a second valve element, wherein:
 the first valve element is movable relative to the second valve element to bring a first effective surface of the first valve element into fluidic connection with a second effective surface of the second valve element, and to control, establish or block a flow path; and
 the second valve element comprises an elastic region configured to, under the influence of a pressure of a fluid, compensate for an axial angle between the first valve element and the second valve element such that the first effective surface and the second effective surface can be aligned parallel to each other.

2. The valve according to claim 1, wherein:
the second valve element comprises an outer region and an inner region;
the inner region comprises the second effective surface; and
the outer region is connected to the inner region via the elastic region,
wherein the inner region is elastically movable with respect to the outer region as a result of the elastic region.

3. The valve according to claim 2, wherein:
the outer region is fixedly arranged with respect to the first valve element; and
the inner region is elastically alignable with respect to the first valve element.

4. The valve according to claim 2, wherein the elastic region comprises one or more webs, which are each connected to the outer region on one side and to the inner region on an opposite side, so that the inner region can tilt with respect to the outer region.

5. The valve according to claim 1, comprising a sealing structure configured such that the pressure of the fluid causes an at least partial increase in volume of the sealing structure, such that the first valve element and the second valve element are pressed against each other for fluidically sealing the flow path.

6. The valve according to claim 5, wherein the sealing structure comprises a region that is elastically deformable such that the axial angle between the first valve element and the second valve element leads to a variation in a thickness of the sealing structure when the first effective surface and the second effective surface are aligned parallel to each other and are pressed against each other.

7. The valve according to claim 1, comprising
a sealing structure connectable to the fluid to effectuate, under the influence of the pressure of the fluid, fluidic sealing of the flow path,
wherein the sealing structure is configured such that there is an at least partial increase in volume of the sealing structure under the influence of the pressure of the fluid, which effectuates the fluidic sealing of the flow path.

8. The valve according to claim 7, wherein the fluidic sealing of the flow path encompasses a pressing of opposite surfaces of the valve.

9. The valve according to claim 7, comprising at least one of the following features:
the sealing structure is configured such the at least partial increase in volume of the sealing structure presses the first valve element and the second valve element against each other for fluidically sealing the flow path;
the valve comprises a first surface, the sealing structure comprises a second surface, the first surface is located opposite the second surface, and the at least partial increase in volume of the sealing structure takes place at the first surface, such that the at least partial increase in volume presses the first surface against the second surface for fluidically sealing the flow path.

10. The valve according to claim 7, wherein the sealing structure comprises a sealing channel connectable to the fluid to effectuate fluidic sealing, under the influence of a pressure of the fluid, of the flow path, the sealing channel being separate from the flow path and being fluidically separated therefrom.

11. The valve according to claim 7, comprising at least one of the following features:
the first valve element comprises the sealing structure, wherein the sealing structure presses against the second valve element at least for fluidically sealing the flow path;
the second valve element comprises the sealing structure, wherein the sealing structure presses against the first valve element at least for fluidically sealing the flow path; and
the sealing structure is separate from the first valve element and the second valve element, wherein the sealing structure presses the first valve element and the second valve element against each other at least for fluidically sealing the flow path.

12. The valve according to claim 1, comprising at least one of the following features:
the first valve element is rotatable relative to the second valve element;
the first valve element is translatable relative to the second valve element.

13. The valve according to claim 7, wherein the sealing structure is arranged with respect to the first valve element and/or the second valve element and acts thereon such that an axial angular offset between the first valve element and the second valve element is compensated for or at least reduced.

14. The valve according to claim 13, wherein the first valve element is axially fixedly arranged in the valve, and the second valve element is configured to elastically align with respect to the axial arrangement of the first valve element, the sealing structure being arranged with respect to the second valve element and acting thereon such that the second valve element adapts to the axial arrangement of the first valve element.

15. The valve according to claim 5, comprising at least one of the following features:
the sealing structure comprises a plurality of layers and at least one microfluidic channel formed by one or more recesses in at least one of the plurality of layers;
the sealing structure comprises a plurality of layers and at least one microfluidic channel formed by one or more recesses in at least one of the plurality of layers, wherein at least one of the layers comprises a material selected from the group consisting of: metal; stainless steel; ceramic; aluminum oxide; magnesium oxide; zirconium oxide; aluminum titanate; polymer; polyether ether ketone (PEEK); polyetherketoneketone (PEKK); and polyetherimide (PEI).

16. The valve according to claim 15, comprising one or more of the following features:
the sealing structure is configured such that the at least one microfluidic channel can expand at least in a section under the influence of the pressure of the fluid to effectuate the fluidic sealing of the flow path;
the at least one microfluidic channel forms at least part of the flow path.

17. The valve according to claim 7, comprising at least one of the following features:
the sealing structure is spatially separated from the flow path, or at least in the region of the flow path to be sealed by the sealing structure;
the sealing structure is not part of the flow path to be sealed by the sealing structure;
the flow path, or at at least the part of the flow path to be sealed by the sealing structure, comprises an outer wall within which the fluid can flow;

the flow path, or at at least the part of the flow path to be sealed by the sealing structure, comprises an outer wall, within which the fluid can flow, wherein the sealing structure is spatially separated from the outer wall, and the sealing structure is located outside the flow path and the outer wall thereof;

the sealing structure is part of the flow path and the fluid flowing through the flow path flows through the sealing structure.

18. A high-performance chromatography system, comprising:
the valve according to claim 1;
a pump for moving the mobile phase; and
a stationary phase for separating components of the sample liquid introduced into the mobile phase.

19. The valve according to claim 1, wherein the first valve element is movable relative to the second valve element in an axial direction to bring the first effective surface of the first valve element into contact with the second effective surface of the second valve element.

20. The valve according to claim 1, wherein the fluid comprises the mobile phase.

\* \* \* \* \*